(12) United States Patent
Watanabe

(10) Patent No.: US 10,848,724 B2
(45) Date of Patent: Nov. 24, 2020

(54) DISPLAY CONTROL DEVICE

(71) Applicant: AISIN SEIKI KABUSHIKI KAISHA, Kariya (JP)

(72) Inventor: Kazuya Watanabe, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/635,370

(22) PCT Filed: Feb. 27, 2018

(86) PCT No.: PCT/JP2018/007263
§ 371 (c)(1),
(2) Date: Jan. 30, 2020

(87) PCT Pub. No.: WO2019/058585
PCT Pub. Date: Mar. 28, 2019

(65) Prior Publication Data
US 2020/0186767 A1   Jun. 11, 2020

(30) Foreign Application Priority Data
Sep. 20, 2017   (JP) .................. 2017-180532

(51) Int. Cl.
*H04N 9/31*   (2006.01)
*B60R 11/02*   (2006.01)
*B60R 11/04*   (2006.01)

(52) U.S. Cl.
CPC ....... *H04N 9/3185* (2013.01); *B60R 11/0229* (2013.01); *B60R 11/04* (2013.01);
(Continued)

(58) Field of Classification Search
CPC .............. H04N 7/181; H04N 9/3185
(Continued)

(56) References Cited

U.S. PATENT DOCUMENTS

| 10,046,700 B2 | 8/2018 | Fujita et al. |
| 2008/0136912 A1* | 6/2008 | Iwano ............ G06T 1/0007 348/148 |

(Continued)

FOREIGN PATENT DOCUMENTS

| JP | 2008-102620 A | 5/2008 |
| WO | 2013/175753 A1 | 11/2013 |

OTHER PUBLICATIONS

International Search Report for PCT/JP2018/007263 dated May 22, 2018 (PCT/ISA/210).

*Primary Examiner* — Michael Lee
(74) *Attorney, Agent, or Firm* — Sughrue Mion, PLLC

(57) ABSTRACT

A correction unit of a display control device according to an embodiment corrects a projection position of the display target image to a second direction, which is from a first coordinate corresponding to a position where the virtual projection plane intersects with a first virtual straight line extending in a first direction corresponding to a vehicle length direction of the vehicle from the front image capture unit or the rear image capture unit that captures the display target image to a second coordinate corresponding to a position where the virtual projection plane intersects with a virtual reference line extending in the first direction that is apart from the first virtual straight line in a vehicle width direction of the vehicle to project the display target image on a corrected projection position and to generate a three-dimensional image.

10 Claims, 14 Drawing Sheets

(52) U.S. Cl.
CPC ... *B60R 2300/105* (2013.01); *B60R 2300/205* (2013.01); *B60R 2300/302* (2013.01); *B60R 2300/60* (2013.01)

(58) Field of Classification Search
USPC .................................................. 348/148, 745
See application file for complete search history.

(56) References Cited

U.S. PATENT DOCUMENTS

| | | | | |
|---|---|---|---|---|
| 2012/0033077 | A1* | 2/2012 | Kitaura | G06T 7/55 348/148 |
| 2012/0062745 | A1* | 3/2012 | Han | G08G 1/167 348/148 |
| 2013/0258047 | A1* | 10/2013 | Morimoto | G06T 5/006 348/36 |
| 2013/0314503 | A1* | 11/2013 | Nix | G06K 9/00805 348/46 |
| 2014/0354816 | A1* | 12/2014 | Inanobe | B60R 1/002 348/148 |
| 2014/0375812 | A1* | 12/2014 | Ehlgen | G06T 15/205 348/148 |
| 2015/0138312 | A1* | 5/2015 | Liu | G06T 3/4038 348/36 |
| 2015/0334301 | A1 | 11/2015 | He et al. | |
| 2016/0350894 | A1 | 12/2016 | Kosaki | |
| 2017/0195564 | A1* | 7/2017 | Appia | B60R 1/00 |
| 2020/0154091 | A1* | 5/2020 | Pflug | G06T 15/50 |
| 2020/0175722 | A1* | 6/2020 | Nagai | H04N 7/18 |

\* cited by examiner

DISPLAY CONTROL DEVICE

CROSS-REFERENCE TO RELATED APPLICATIONS

This application is a national stage application of International Application No. PCT/JP2018/007263, filed on Feb. 27, 2018, which designates the United States, incorporated herein by reference, and which claims the benefit of priority from Japanese Patent Application No. 2017-180532, filed on Sep. 20, 2017, the entire contents of which are incorporated herein by reference.

TECHNICAL FIELD

Embodiments described herein relate to a display control device.

BACKGROUND

Conventionally, an image processing device is proposed that captures periphery of a vehicle by a plurality of image capture units provided at the periphery of the vehicle, that synthesizes captured images to generate a three-dimensional synthetic image, and that displays on a display device in the vehicle, thereby making a driver to recognize the circumstance around the vehicle.

In this image processing device, in order to reduce the unnaturalness in displaying that occurs when the images captured by the image capture units are synthesized, the distance to the object to be captured is calculated and a projection plane is corrected in accordance with the distance from the image capture unit to the object and the distance from a reference point (for example, center) of the projection plane.

However, in conventional techniques, calculation of the distance to the object is required for solving the unnaturalness in displaying of the synthetic image, and the process is complicated and the load to a calculation unit is large. Moreover, an increase in the cost of the processing device is caused. In addition, for the displayed three-dimensional images, there are unresolvable problems by the corrections according to the conventional techniques described above. For example, there are problems in that the size of the displayed object is unnaturally small or the road width becomes suddenly narrow.

In view of the above, one of the problems of embodiments addressed herein is providing a display control device that can, when a three-dimensional image is generated, reduce the unnaturalness by a simpler structure.

A display control device according to an embodiment includes, for example, an image acquisition unit, a projection plane acquisition unit, a correction unit, and an image synthesis unit. The image acquisition unit is provided to a vehicle and acquires a display target image that is at least one of a front image acquired from a front image capture unit that captures a region including a front of the vehicle and a rear image acquired from a rear image capture unit that captures a region including a rear of the vehicle. The projection plane acquisition unit acquires a three-dimensional virtual projection plane to which the display target image is projectable, where the three-dimensional virtual projection plane includes at least a side surface that rises in a height direction from a ground contact surface of the vehicle. In a case where the display target image acquired by the image acquisition unit is projected on the virtual projection plane, the correction unit corrects a projection position of the display target image to a second direction, which is from a first coordinate corresponding to a position where the virtual projection plane intersects with a first virtual straight line extending in a first direction corresponding to a vehicle length direction of the vehicle from the front image capture unit or the rear image capture unit that captures the display target image to a second coordinate corresponding to a position where the virtual projection plane intersects with a virtual reference line extending in the first direction that is apart from the first virtual straight line in a vehicle width direction of the vehicle. The image synthesis unit projects the display target image on a corrected projection position, and generates a three-dimensional image. According to this structure, for example, the projection position of the display target image is corrected and extended to the width direction (vehicle width direction) on the virtual projection plane. As a result, the unnaturalness in displaying, such as the size of the object displayed on the virtual projection plane becoming unnaturally small or the road width, which extends in the first direction, becoming suddenly narrowed, can be reduced.

In the display control device according to an embodiment, the correction unit acquires a correction ratio for correcting the projection position to the second direction on the basis of a first distance in the second direction between the second coordinate and a fourth coordinate where the virtual projection plane intersects with a second virtual straight line connecting between a process target image capture unit that captures the display target image and a third coordinate where the virtual reference line intersects with a virtual reference plane set at a predetermined distance from the process target image capture unit in the first direction, and a second distance in the second direction between the first virtual straight line and the virtual reference line. According to this structure, for example, reflection degree of correction is changeable depending on the position from the first virtual straight line along the virtual reference plane and the three-dimensional synthetic image without feeling of strangeness can be generated on the virtual projection plane. In this case, any object existing on the virtual reference line is projected near the intersection with the virtual reference line on the virtual projection plane. As a result, for example, which side the distantly-existing object in the first direction is present with respect to the virtual reference line becomes easily recognizable. That is to say, the positional relation between the vehicle and the object becomes easily recognizable.

In the display control device an embodiment, the virtual reference line extends in the first direction along a left side surface or a right side surface of a vehicle body of the vehicle. According to this structure, for example, any object existing on the virtual reference line along the left side surface of the vehicle body is projected near the intersection with the virtual reference line on the virtual projection plane. As a result, for example, which side the distantly-existing object in the first direction is present with respect to the left side surface (outer surface) of the vehicle becomes easily recognizable. That is to say, the three-dimensional synthetic image can be projected on the virtual projection plane that enables easy recognition of whether the vehicle body collides with the object when the vehicle moves. This similarly applies when the virtual reference line extends along the right side surface of the vehicle body.

In the display control device according to an embodiment, the image acquisition unit further acquires a side display target image corresponding to at least one of a left side image acquired from a left side image capture unit that captures a region including a left side of the vehicle and a right side image acquired from a right side image capture unit that captures a region including a right side of the vehicle. The virtual reference line extends in the first direction from a position overlapping with the left side image capture unit or the right side image capture unit in the vehicle width direction. The image synthesis unit combines the side display target image with the display target image corrected by the correction unit, and generates the three-dimensional image.

According to this structure, for example, the object existing on the virtual reference line extending in the first direction that is captured by the left side image capture unit is projected near the intersection between the virtual reference line and the virtual projection plane. On the other hand, if the same object is captured by the front image capture unit, the object is viewed obliquely but the projection position is corrected to the second direction (direction toward the virtual reference line) by the correction of the correction unit. Therefore, the deviation of the projection positions of the object captured by the left side image capture unit and the front image capture unit on the virtual projection plane can be reduced, thereby contributing to an improvement in the quality of the three-dimensional synthetic image. This similarly applies to the object that is captured by the right side image capture unit.

A display control device according to an embodiment includes an image acquisition unit, a projection plane acquisition unit, a correction unit, and an image synthesis unit. The image acquisition unit is provided to a vehicle and acquires a display target image, where the display target image is at least one of a left side image acquired from a left side image capture unit that captures a region including a left side of the vehicle and a right side image acquired from a right side image capture unit that captures a region including a right side of the vehicle. The projection plane acquisition unit acquires a three-dimensional virtual projection plane to which the display target image is projectable, where the three-dimensional virtual projection plane includes at least a side surface that rises in a height direction from a ground contact surface of the vehicle. In a case where the display target image acquired by the image acquisition unit is projected on the virtual projection plane, the correction unit corrects a projection position of the display target image to a second direction, which is from a first coordinate corresponding to a position where the virtual projection plane intersects with a first virtual straight line extending in a first direction corresponding to a vehicle width direction of the vehicle from the left side image capture unit or the right side image capture unit that captures the display target image to a second coordinate corresponding to a position where the virtual projection plane intersects with a virtual reference line extending in the first direction that is apart from the first virtual straight line in a vehicle length direction of the vehicle. The image synthesis unit projects the display target image on a corrected projection position, and generates a three-dimensional image. According to this structure, for example, the projection position of the display target image is corrected and extended to the vehicle length direction on the virtual projection plane. As a result, in the case where the display target image captured by at least one of the left side image capture unit and the right side image capture unit is projected on the virtual projection plane, the unnaturalness in displaying, for which for example, the object on the side of the vehicle (i.e., own vehicle) displayed on the virtual projection plane becomes unnaturally small or the width of a road extending in the first direction (to the side of the vehicle) becomes suddenly narrowed, can be reduced.

In the display control device according to an embodiment, the correction unit acquires a correction ratio for correcting the projection position to the second direction on the basis of a first distance in the second direction between the second coordinate and a fourth coordinate where the virtual projection plane intersects with a second virtual straight line connecting between a process target image capture unit that captures the display target image and a third coordinate where the virtual reference line intersects with a virtual reference plane set at a predetermined distance from the process target image capture unit in the first direction, and a second distance in the second direction between the first virtual straight line and the virtual reference line. According to this structure, for example, reflection degree of correction is changeable depending on the position from the first virtual straight line along the virtual reference plane and the three-dimensional synthetic image without feeling of strangeness can be generated on the virtual projection plane. In this case, any object existing on the virtual reference line is projected near the intersection with the virtual reference line on the virtual projection plane. For example, which side the distantly-existing object in the first direction (to the side of the vehicle) is present with respect to the virtual reference line becomes easily recognizable. That is to say, the positional relation between the vehicle and the object existing on the side of the vehicle becomes easily recognizable.

In the display control device according to an embodiment, the virtual reference line can extend in the first direction along a front surface or a rear surface of a vehicle body of the vehicle. According to this structure, for example, any object existing on the virtual reference line along the front surface of the vehicle body is projected near the intersection with the virtual reference line on the virtual projection plane. For example, which side the distantly-existing object in the first direction (to the side of the vehicle) is present with respect to the front surface (outer surface) of the vehicle becomes easily recognizable. That is to say, it becomes easier to recognize whether the object exists ahead of or behind the front end of the vehicle, and the three-dimensional synthetic image can be projected on the virtual projection plane that enables easy recognition of whether the vehicle body collides with the object when the vehicle moves. This similarly applies when the virtual reference line is along the rear surface of the vehicle body.

In the display control device according to an embodiment, the image acquisition unit further acquires a display target image in a front-rear direction that is at least one of a front image acquired from a front image capture unit that captures a region including a front of the vehicle and a rear image acquired from a rear image capture unit that captures a region including a rear of the vehicle, the virtual reference line extends in the first direction from a position overlapping with the front image capture unit or the rear image capture unit in the vehicle length direction, and the image synthesis unit combines the display target image in the front-rear direction with the display target image corrected by the correction unit, and generates the three-dimensional image. According to this structure, for example, the object existing on the virtual reference line extending in the first direction and captured by the front image capture unit is projected near the intersection between the virtual reference line and the virtual projection plane. On the other hand, if the same object is captured by the left side image capture unit, for example, the object is viewed obliquely, and the projection position is corrected to the second direction (direction toward the virtual reference line) by the correction of the correction unit. Therefore, the deviation of the projection positions of the object captured by the left side image capture unit and by the front image capture unit on the virtual projection plane can be reduced, thereby contributing to an improvement in the quality of the three-dimensional synthetic image. This similarly applies to the object that is captured by the rear image capture unit.

The correction unit of display control device according to an embodiment can, for example, change the correction of the projection position in accordance with a height from the ground contact surface of the vehicle. According to this structure, for example, the sudden correction of the projection position to the second direction at the connection part between the ground contact surface of the vehicle and the virtual projection plane is avoidable and the continuity of ground contact surface and the virtual projection plane is easily maintainable.

DESCRIPTION OF EMBODIMENTS

Exemplary embodiments are hereinafter disclosed. The structure of the embodiments described below and the operation, results, and effects based on the structure are mere examples. The embodiments described herein can be achieved by other structure than the structures disclosed in the embodiments below, and at least one of various effects and side effects acquired based on the fundamental structures can be acquired.

In the present embodiment, a vehicle 1 incorporating a display control device (display control system) may be, for example, an automobile including an internal-combustion engine (not illustrated) as a driving source, that is, an internal-combustion engine automobile, or an automobile including an electric motor (not illustrated) as a driving source, that is, an electric automobile or a fuel cell automobile. Alternatively, the vehicle 1 may be a hybrid automobile including both as the driving source, or an automobile including another driving source. The vehicle 1 may incorporate various transmissions or various devices necessary to drive the internal-combustion engine or the electric motor, for example incorporate a system, components, and the like. In one example of the driving methods, the vehicle 1 may be a four-wheel driving vehicle in which the driving force is transmitted to all four wheels 3 so that the four wheels are entirely used as the driving wheels. The method, the number, and the layout of the device regarding the driving of the wheels 3 can be variously set. The driving method is not limited to the four-wheel driving method and may be a front-wheel driving method or a rear-wheel driving method.

Figure 1:
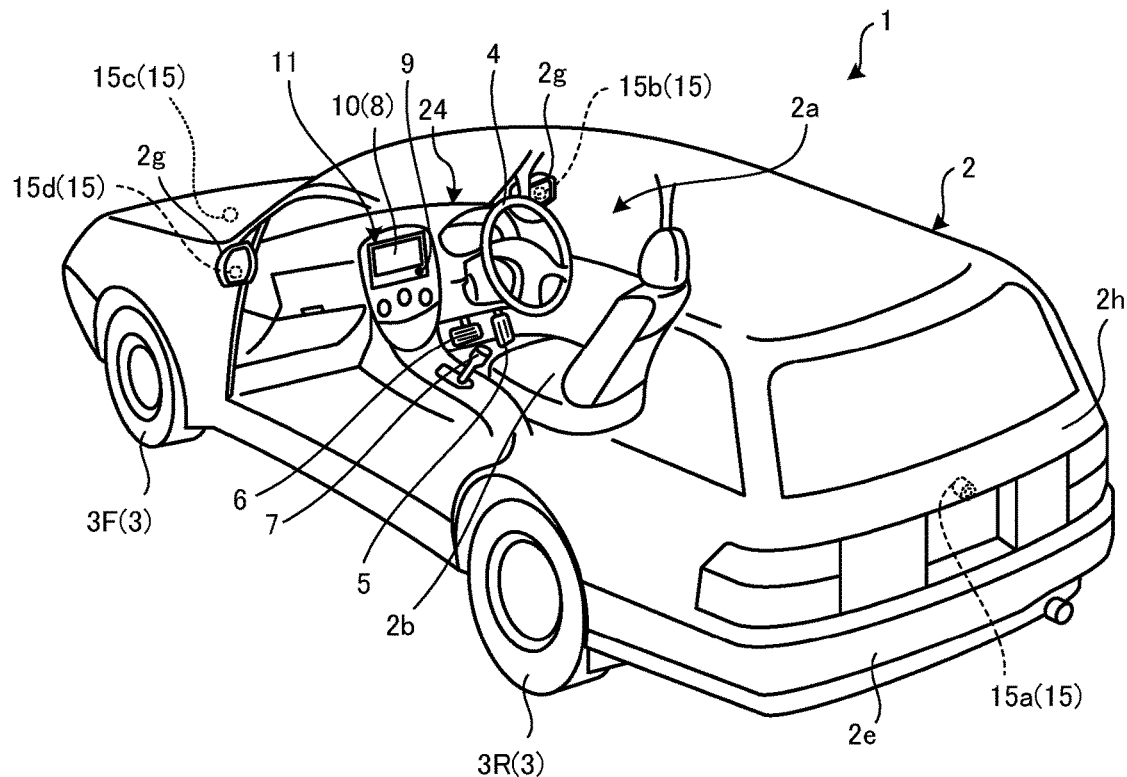
FIG. 1 is a perspective view illustrating one example of a state in which a part of a cabin of a vehicle incorporating a display control device according to one embodiment is transparent.

As illustrated in FIG. 1, a vehicle body 2 forms a cabin 2a for an occupant (not illustrated) to get in. In the cabin 2a, a steering unit 4, an acceleration operation unit 5, a braking operation unit 6, a transmission operation unit 7, and the like are provided so as to face a seat 2b of a driver corresponding to one occupant. One example of the steering unit 4 is a steering wheel that protrudes from a dashboard 24, and one example of the acceleration operation unit 5 is an accelerator pedal positioned at the driver' feet. One example of the braking operation unit 6 is a brake pedal disposed at the driver's feet, and one example of the transmission operation unit 7 is a shift lever that protrudes from a center console. Note that the steering unit 4, the acceleration operation unit 5, the braking operation unit 6, the transmission operation unit 7, and the like are not limited to the aforementioned units.

In the cabin 2a, a display device 8 and a sound output device 9 are provided. One example of the display device 8 is an LCD (liquid crystal display) or an OELD (organic electroluminescent display). One example of the sound output device 9 is a speaker. The display device 8 is covered with, for example, a transparent operation input unit 10 such as a touch panel. The occupant can see the image displayed on a display screen of the display device 8 through the operation input unit 10. In addition, the occupant (driver, for example) can execute the operation input through an operation of touching, pushing, or moving in the operation input unit 10 with his finger or hand at a position corresponding to the image displayed on the display screen of the display device 8. The display device 8, the sound output device 9, the operation input unit 10, and the like are provided to, for example, a monitor device 11 that is positioned at a central part of the dashboard 24 in a vehicle width direction, that is, a left-right direction. The monitor device 11 may include an operation input unit (not illustrated) such as a switch, a dial, a joystick, or a pushbutton. In addition, a sound output device (not illustrated) may be provided at another position in the cabin 2a different from the position of the monitor device 11, and both the sound output device 9 of the monitor device 11 and the other sound output device can output the sound. Note that the monitor device 11 may also serve as a navigation system or an audio system, for example.

Figure 2:
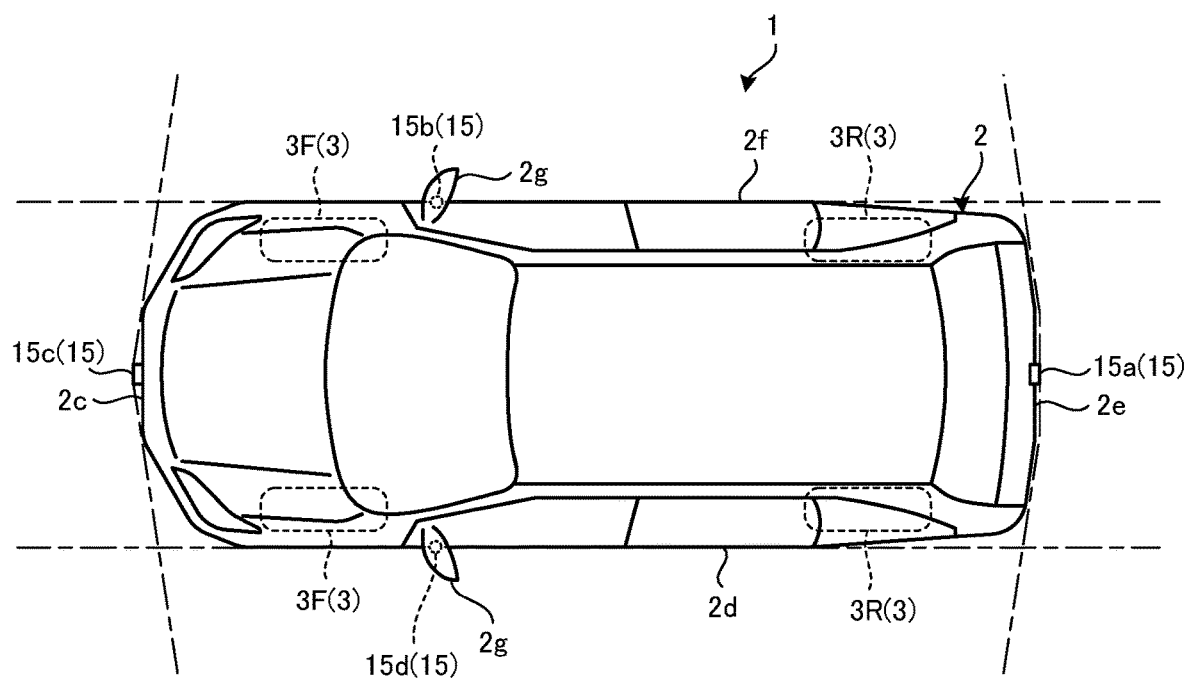
FIG. 2 is a plan view (overhead view) illustrating one example of the vehicle incorporating the display control device according to one embodiment.
Figure 3:
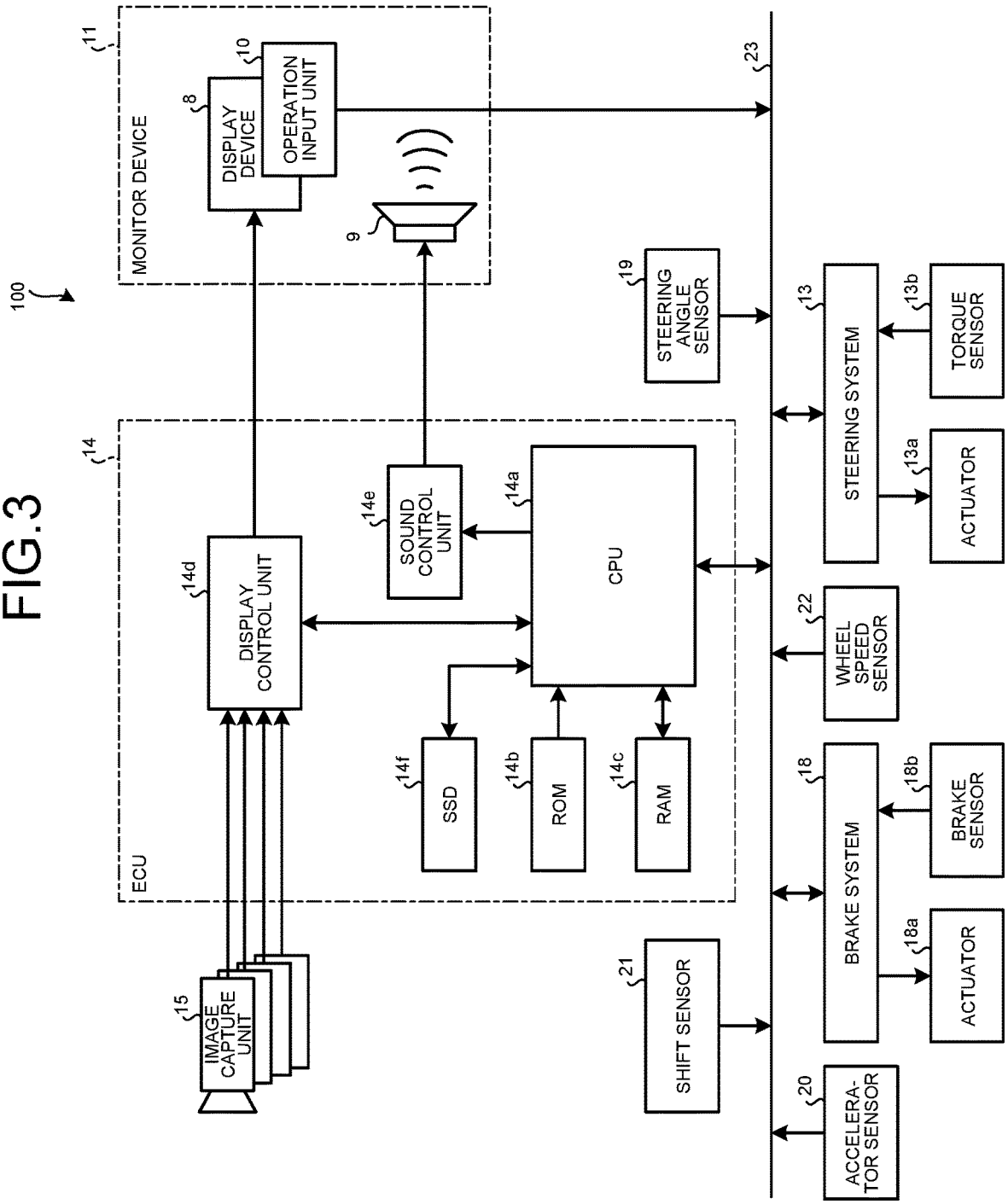
FIG. 3 is a block diagram illustrating one example of a structure of a display control system including the display control device according to one embodiment.

Moreover, as illustrated in FIG. 1 and FIG. 2, the vehicle 1 is, for example, a four-wheeled automobile including left and right front wheels 3F and left and right rear wheels 3R. These four wheels 3 may be steerably configured. As illustrated in FIG. 3, the vehicle 1 includes a steering system 13 that steers at least two of the wheels 3. The steering system 13 includes an actuator 13a and a torque sensor 13b. The steering system 13 is electrically controlled by an ECU 14 (electronic control unit) so as to operate the actuator 13a. The steering system 13 is, for example, an electric power steering system or an SBW (steer by wire) system. The steering system 13 uses the actuator 13a to cover the steering power by adding the torque, that is, assist torque to the steering unit 4 or to steer the wheel 3 or the wheels 3. In this case, the actuator 13a may steer either one wheel 3 or plural wheels 3. In addition, the torque sensor 13b detects the torque that the driver applies to the steering unit 4, for example.

As illustrated in FIG. 2, the vehicle body 2 includes, for example, four image capture units 15a to 15d as a plurality of image capture units 15. The image capture unit 15 is, for example, a digital camera that incorporates an image capture element such as a CCD (Charge Coupled Device) or a CIS (CMOS image sensor). The image capture unit 15 can output moving picture data (captured image data) at a predetermined frame rate. The image capture unit 15 includes a wide-angle lens or a fisheye lens and can photograph in the range of 140 to 220° in a horizontal direction. The image capture unit 15 may have its optical axis set obliquely downward. Thus, the image capture unit 15 sequentially photographs the external environment around the vehicle 1 including a road surface where the vehicle 1 can move or objects (obstacles such as rock, tree, person, bicycle, and other vehicle), and outputs the result as captured image data.

The image capture unit 15a (rear image capture unit) is positioned at an end part 2e on a rear side of the vehicle body 2, for example, and is provided at a wall part below a rear window of a door 2h in the rear hatch. Thus, the image capture unit 15a captures a rear image including a circumstance of a region behind the vehicle 1. The image capture unit 15b (right side image capture unit) is positioned at an end part 2f on the right side of the vehicle body 2 and is provided to a door mirror 2g on the right side. Thus, the image capture unit 15b captures a right side image including a circumstance of a region including the right side of the vehicle 1. The image capture unit 15c (front image capture unit) is positioned at a front side of the vehicle body 2, that is, at an end part 2c on the front side in a front-rear direction of the vehicle, and is provided to a front bumper or a front grill, for example. Thus, the image capture unit 15c captures a front image including a circumstance of a region in front of the vehicle 1. The image capture unit 15d (left side image capture unit) is positioned at an end part 2d on the left side of the vehicle body 2 and is provided to the door mirror 2g on the left side. Thus, the image capture unit 15d captures a left side image including a circumstance of a region including the left side of the vehicle 1.

As illustrated in FIG. 3, in a display control system 100 (display control device), the ECU 14, the monitor device 11, the steering system 13, and the like and moreover, a brake system 18, a steering angle sensor 19, an accelerator sensor 20, a shift sensor 21, a wheel speed sensor 22, and the like are electrically connected through an in-vehicle network 23 as an electric communication line. The in-vehicle network 23 is constructed as a CAN (controller area network), for example. The ECU 14 can control the steering system 13, the brake system 18, and the like by transmitting a control signal through the in-vehicle network 23. Moreover, the ECU 14 can receive the detection results from the torque sensor 13b, a brake sensor 18b, the steering angle sensor 19, the accelerator sensor 20, the shift sensor 21, and the wheel speed sensor 22, and the operation signal from the operation input unit 10 and the like through the in-vehicle network 23.

The ECU 14 includes, for example, a CPU 14a (central processing unit), a ROM 14b (read only memory), a RAM 14c (random access memory), a display control unit 14d, a sound control unit 14e, an SSD 14f (solid state drive, flash memory), and the like. The CPU 14a reads out a program stored (installed) in a nonvolatile storage device, for example in the ROM 14b, and executes a calculation process in accordance with the program. The CPU 14a performs image processing regarding the image to be displayed on the display device 8, for example. The CPU 14a performs the image processing or the calculation process on the image data captured by the image capture unit 15 and generates a three-dimensional peripheral image (for example, overhead image). The CPU 14a can change the viewpoint of the peripheral image to be generated.

The RAM 14c temporarily stores various pieces of data that are used in the calculation in the CPU 14a. In addition, the display control unit 14d performs the synthesis of the image data displayed on the display device 8 mainly in the calculation process in the ECU 14. Moreover, the sound control unit 14e performs the process of the sound data to be output from the sound output device 9 mainly in the calculation process in the ECU 14. The SSD 14f is a rewritable nonvolatile storage unit that can store the data even if the power of the ECU 14 is turned off. Note that the CPU 14a, the ROM 14b, the RAM 14c, and the like can be integrated within one package. Instead of the CPU 14a, the ECU 14 may include other logic circuit or logical calculation processor such as a DSP (digital signal processor). The SSD 14f may be replaced by an HDD (hard disk drive) or the SSD 14f and the HDD may be provided separate from the ECU 14.

The brake system 18 is, for example, an ABS (anti-lock brake system) that prevents the lock of the brake, a skid prevention device (ESC (electronic stability control)) for preventing the skid of the vehicle 1 in cornering, an electric brake system that reinforces the braking force (assists the braking), or a BBW (brake by wire). The brake system 18 applies the braking force to the wheel 3 or the vehicle 1 through an actuator 18a. The brake system 18 can perform various controls by detecting the symptom of the lock of the brake, the racing of the wheel 3, the skid, or the like on the basis of the difference in revolutions of the left and right wheels 3. The brake sensor 18b is, for example, a sensor that detects the position of a movable part of the braking operation unit 6.

The steering angle sensor 19 is, for example, a sensor that detects the amount of steering of the steering unit 4 such as a steering wheel. The ECU 14 executes various controls after acquiring the amount of the driver's steering of the steering unit 4, the amount of steering of each wheel 3 in the automated steering, and the like from the steering angle sensor 19. The accelerator sensor 20 is, for example, a sensor that detects the position of a movable part of the acceleration operation unit 5. The shift sensor 21 is, for example, a sensor that detects the position of a movable part of the transmission operation unit 7. The wheel speed sensor 22 is a sensor that detects the amount of revolutions of the wheel 3 or the number of revolutions of the wheel 3 per unit time. The wheel speed sensor 22 outputs the number of wheel speed pulses representing the detected number of revolutions as a sensor value. The ECU 14 calculates the amount of movement of the vehicle 1 on the basis of the sensor value acquired from the wheel speed sensor 22 and performs various controls.

Note that the aforementioned structure, arrangement, electric connection mode, and the like of the sensors and actuators are mere examples and can be variously set (changed).

Figure 4:
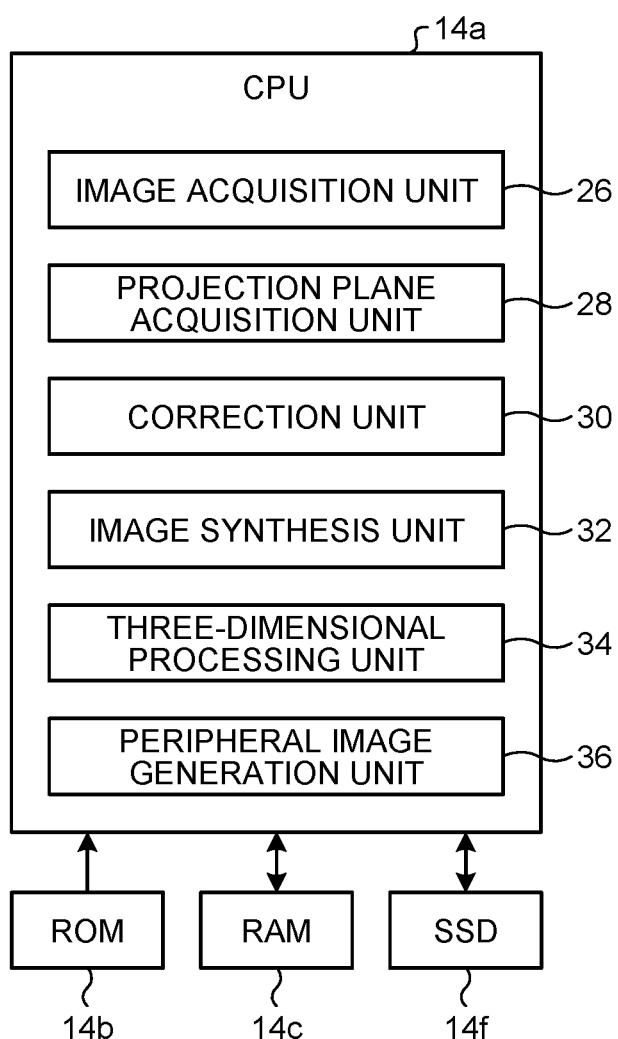
FIG. 4 is an exemplary block diagram of a structure of a CPU of the display control device according to one embodiment.

The CPU 14a included in the ECU 14 performs display of the image of the environment around the vehicle 1 based on the image data captured by the image capture unit 15 in a three-dimensional mode, for example. In order to achieve this function, the CPU 14a includes various modules as illustrated in FIG. 4. The CPU 14a includes, for example, an image acquisition unit 26, a projection plane acquisition unit 28, a correction unit 30, an image synthesis unit 32, a three-dimensional processing unit 34, a peripheral image generation unit 36, and the like. These modules can be achieved when the program installed and stored in the storage device like the ROM 14b is read out and executed.

The image acquisition unit 26 acquires information necessary to display the periphery of the vehicle 1. For example, the image acquisition unit 26 acquires a plurality of pieces of captured image data (for example, front image, right side image, left side image, and rear image) from the image capture units 15 that capture the images of the periphery of the vehicle 1.

Figure 5:
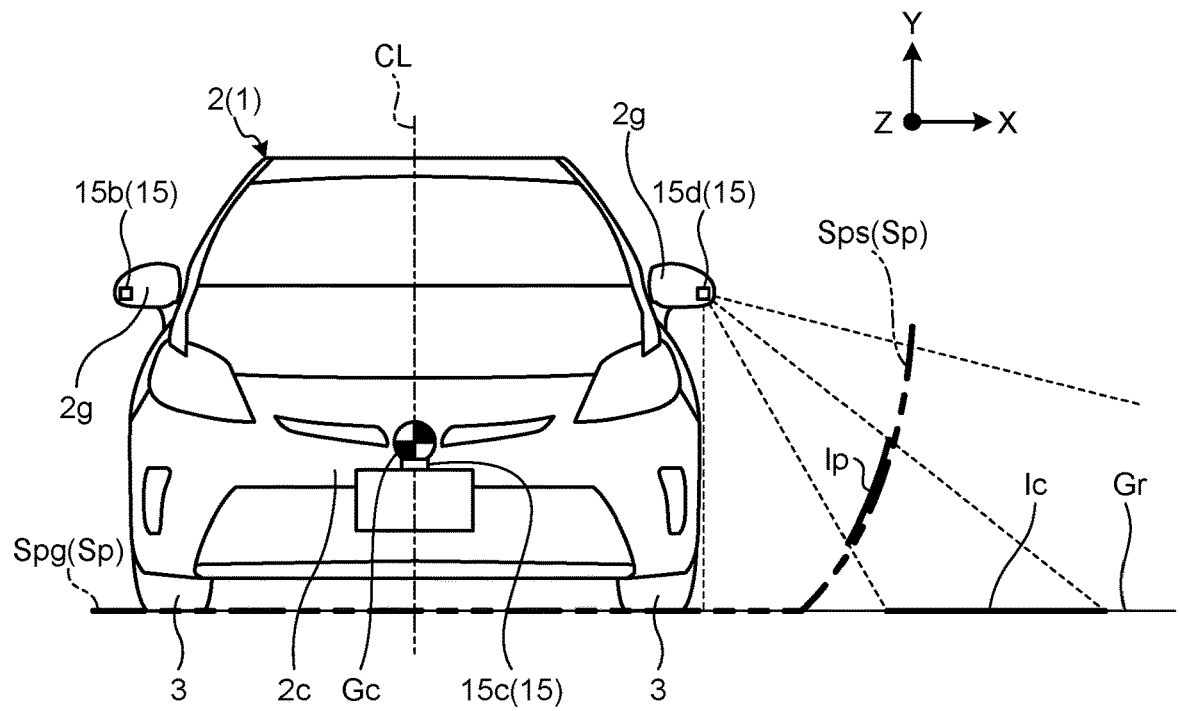
FIG. 5 is an exemplary and schematic explanatory view in which a photograph image in a display control system according to one embodiment is projected on a virtual projection plane.
Figure 6:
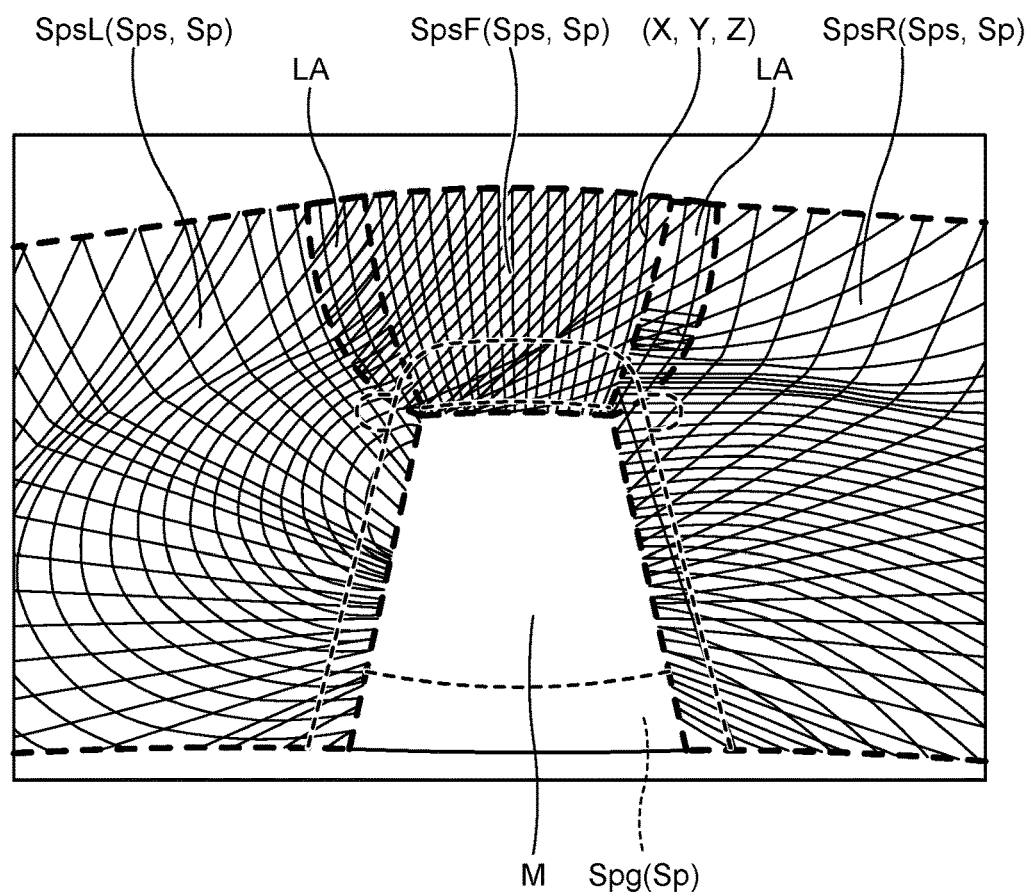
FIG. 6 is an exemplary and schematic explanatory view of a virtual projection plane (three-dimensional shape model) used in the display control device according to one embodiment.
Figure 7:
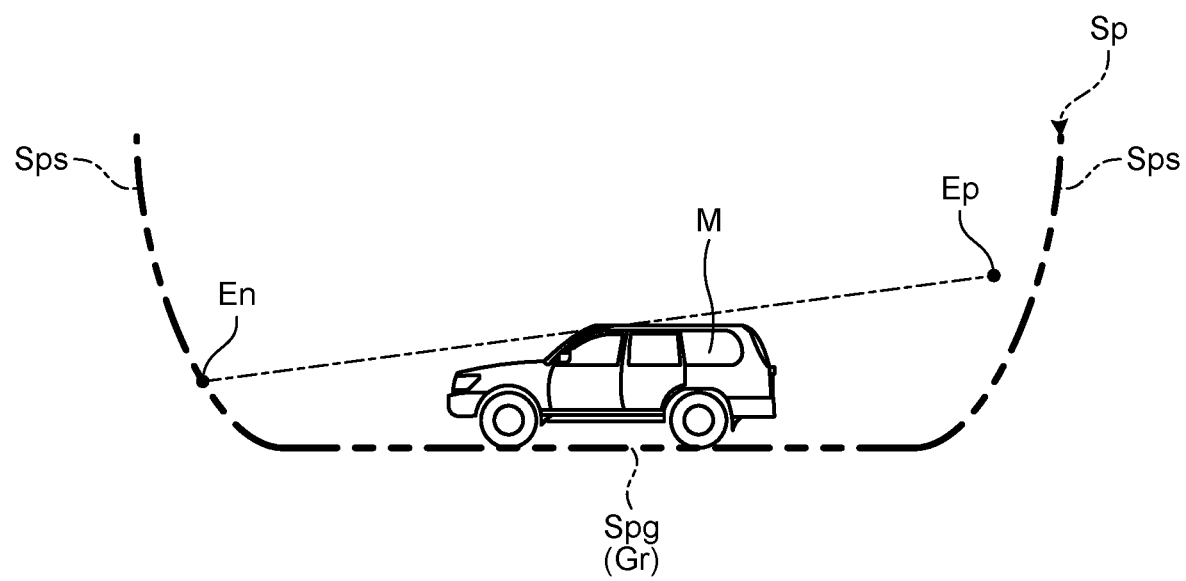
FIG. 7 is a schematic and exemplary side view of a vehicle shape model and a virtual projection plane including a bottom surface and a side surface in the display control system according to one embodiment.

The projection plane acquisition unit 28 acquires a three-dimensional shape model that is stored in advance in the ROM 14b, the SSD 14f, or the like. The three-dimensional shape model is, for example, the data that defines the virtual projection plane that surrounds the periphery of the vehicle 1. FIG. 5 to FIG. 7 illustrate one example of the three-dimensional shape model. Note that FIG. 5 is a schematic view illustrating one example of projecting a captured image Ic obtained by the image capture unit 15d (left side image capture unit) to a virtual projection plane Sp including a bottom surface Spg and a side surface Sps. FIG. 6 is a schematic view illustrating a structure of the virtual projection plane Sp. FIG. 7 is a schematic view illustrating the shape of the entire virtual projection plane Sp.

The virtual projection plane Sp includes, for example, the bottom surface Spg extending along a ground Gr and the side surface Sps that rises from the bottom surface Spg, that is, the ground Gr as illustrated in FIG. 5 and FIG. 7. The ground Gr is a horizontal surface that is orthogonal to a height direction Y (up-down direction) of the vehicle 1 and is also a surface which the wheel 3 is in contact with. The bottom surface Spg is, for example, an approximately circular flat surface, and is a horizontal surface based on the vehicle 1. The side surface Sps is, for example, a curved surface that is in contact with the bottom surface Spg and rises in the height direction from a part of the bottom surface Spg so as to surround the part of the bottom surface Spg. As illustrated in FIG. 5, the shape of the side surface Sps along the virtual cross section perpendicular to the vehicle 1 passing a center Gc of the vehicle 1 is, for example, elliptical or parabolic. The side surface Sps is, for example, formed as a surface of revolution around a center line CL that extends along the height direction of the vehicle 1 passing the center Gc of the vehicle 1. That is to say, the side surface Sps surrounds the vehicle 1.

As illustrated in FIG. 6, in the case where the virtual projection plane Sp as the three-dimensional shape model is, for example, the projection plane to which the front image mainly representing the front circumstance of the vehicle 1 is projected, the virtual projection plane Sp includes a side surface SpsF that rises from the bottom surface Spg to which the front image is projected, a side surface SpsR to which the right side image is projected, and a side surface SpsL to which the left side image is projected. The virtual projection plane Sp is the data with a mesh structure whose coordinates (X, Y, Z) are defined, and the data of each pixel of the image data captured by the image capture unit 15 is projected on the intersection of the mesh (intersection defined by the coordinates X, Y, Z), for example. Note that the mesh of the virtual projection plane Sp illustrated in FIG. 6 is illustrated for the explanation and in fact, the mesh is set as invisible.

In the case where the image captured by the image capture unit 15 and acquired by the image acquisition unit 26 (display target image) is projected on the virtual projection plane Sp, the correction unit 30 performs correction for solving inconvenience, such as the object displayed in the capture direction becoming unnaturally small or the road width becoming suddenly narrow. For example, correction of enlarging the projected image in the width direction is performed. In the present embodiment, the image capture unit 15*c* is mounted at the generally central part of the vehicle 1 in the vehicle width direction. That is to say, the image capture unit 15*c* is to obliquely view objects other than the capturing target existing in front of the image capture unit 15*c*, that is, objects on the capture central line extending in the capture direction of the image capture unit 15*c*. The image captured by the image capture unit 15*c* is projected on a position where the virtual projection plane Sp intersects with a straight line connecting the object to be captured and the image capture unit 15*c*. As a result, the objects other than the objects on the capture central line are projected on the position closer to the capture central line than the actual position on the virtual projection plane Sp. As such, the size of the displayed object becomes unnaturally small (compressed to the capture central line) or the road width of the road becomes suddenly narrow as described above. In view of this, the correction unit 30 performs correction so as to reduce the unnaturalness in displaying as described above. For example, the display target image corresponding to at least one of the front image obtained from the image capture unit 15*c* (front image capture unit) that captures the image of the region in front of the vehicle 1 and the rear image obtained from the image capture unit 15*a* (rear image capture unit) that captures the image of the region behind the vehicle 1 is corrected. Here, the straight line extending in a first direction, that is, the vehicle length direction of the vehicle 1 from the image capture unit 15*c* or the image capture unit 15*a* is a first virtual straight line. In addition, a coordinate corresponding to the position where the first virtual straight line and the virtual projection plane Sp intersect is referred to as a first coordinate. Furthermore, a straight line extending in the first direction apart from the first virtual straight line to the vehicle width direction of the vehicle 1 is referred to as a virtual reference line. The virtual reference line can be set to extend in the first direction along the left side surface or the right side surface of the vehicle body 2 of the vehicle 1. Moreover, a coordinate corresponding to the position where the virtual reference line and the virtual projection plane Sp intersect is referred to as a second coordinate. The correction unit 30 performs the correction so as to change the projection position of the display target image in the second direction from the first coordinate to the second coordinate. The correction of the projection position is described in detail below. Note that the lens included in the image capture unit 15 may be a wide-angle lens or a fisheye lens in order to achieve the image capture in the wide range, and the image may contain distortion. In view of this, the correction unit 30 may perform the correction of the captured image data on the basis of the distortion of the lens.

The image data of the front image captured by the image capture unit 15*c* that is acquired by the image acquisition unit 26 and corrected by the correction unit 30, the image data of the right side image captured by the image capture unit 15*b*, and the image data of the left side image captured by the image capture unit 15*d* are combined by the image synthesis unit 32 through synthesis at a border portion thereof, and thus, one captured image data is generated. Note that in the case where the image data of the front image and the image data of the right side image are synthesized, and the image data of the front image and the image data of the left side image are synthesized, synthesizing these pieces of data directly along the border portion may result in the clear appearance of the border line. For example, the front image captured by the image capture unit 15*c* and the right side image captured by the image capture unit 15*b* may be different in brightness or tone of color of the image depending on how the sunlight, other light, or the like is irradiated. In this case, the border line caused by the difference in brightness or tone of color may appear and the quality of the image based on the synthesized one captured image data may deteriorate. In view of this, an overlapping area LA in which a horizontal end part of the side surface SpsF where the image data of the front image is projected and a horizontal end part of the side surface SpsR where the image data of the right side image is projected are overlapped is set in the virtual projection plane Sp as illustrated in FIG. 6. In this overlapping area LA, the image synthesis unit 32 may perform a blending process for synthesizing the images by using a % of the image data of the front image and the image data of the right side image. By performing the blending process, the front image and the right side image are synthesized so as to be gradually changed, and the border line that appears due to the difference in brightness or tone of color can be made less visible. Similarly, by performing the blending process also for the front image and the left side image, the border line can be made less visible in the synthesized entire peripheral image.

Additionally, in the case where the peripheral image representing the circumstance behind the vehicle 1 is displayed by the ECU 14, the image synthesis unit 32 similarly synthesizes the image data of the rear image captured by the image capture unit 15*a*, the image data of the right side image captured by the image capture unit 15*b*, and the image data of the left side image captured by the image capture unit 15*d* so as to generate one captured image data.

The three-dimensional processing unit 34 generates the data of the virtual projection image in which the captured image data synthesized by the image synthesis unit 32 is projected on the virtual projection plane Sp (three-dimensional shape model) surrounding the vehicle 1 or being set as a part of the periphery that is defined based on the position where the vehicle 1 exists. As illustrated in FIG. 5, the three-dimensional processing unit 34 calculates a virtual projection image Ip where the captured image Ic is projected on the virtual projection plane Sp. If the captured image Ic is projected on the ground Gr, there are cases where the image gets longer as the distance from the image capture unit 15 increases, resulting in that the image in the output image is displayed longer than the actual length. As is understood from FIG. 5, the virtual projection image Ip projected on the side surface Sps that rises from the ground Gr (bottom surface Spg) is shorter than that the case where the image is projected on the ground Gr, thereby preventing displaying in the output image from being longer than the actual length.

As illustrated in FIG. 6 and FIG. 7, the three-dimensional processing unit 34 disposes a vehicle shape model M corresponding to the vehicle 1 that is stored in the ROM 14*b*, the SSD 14*f*, or the like in the three-dimensional virtual space including the virtual projection plane Sp. The three-dimensional processing unit 34 sets a predetermined transmissivity for the vehicle shape model M that is disposed in the three-dimensional virtual space. Thus, in the three-dimensional virtual space, the virtual projection image Ip on the opposite side can be seen through the vehicle shape model M.

The peripheral image generation unit 36 generates the peripheral image data. In this peripheral image data, the vehicle shape model M and the virtual projection image Ip formed by projecting the captured image data to the virtual projection plane Sp in the three-dimensional virtual space where the captured image is projected are seen from a viewpoint Ep set in the three-dimensional virtual space to a fixation point En. The peripheral image generation unit 36 supplies the generated peripheral image data to the display control unit 14d, and the display control unit 14d causes the display device 8 to display the three-dimensional peripheral image.

Figure 8:
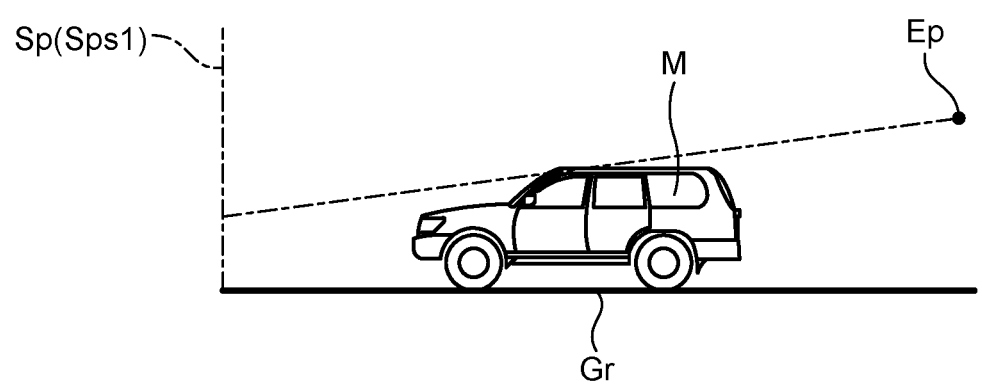
FIG. 8 is a schematic and exemplary side view of the vehicle shape model and a virtual projection plane including only a side surface in the display control system according to one embodiment.

Note that the display control system 100 can display the peripheral image in the three-dimensional mode by the use of the image capture unit 15c (front image capture unit) only. Similarly, the display control system 100 can display the peripheral image in the three-dimensional mode by the use of the image capture unit 15a (rear image capture unit) only, the image capture unit 15b (right side image capture unit) only, or the image capture unit 15d (left side image capture unit) only. In this case, the process in the image synthesis unit 32 and the like is unnecessary. FIG. 8 is a conceptual schematic view illustrating another embodiment of the virtual projection plane Sp when only the image capture unit 15c is used. The virtual projection plane Sp illustrated in FIG. 8 includes only a side surface Sps1 that rises vertically from the ground Gr and that is apart ahead by a predetermined distance from the vehicle shape model M disposed on the ground Gr. In the case of the side surface Sps1, similarly to the virtual projection plane Sp including the bottom surface Spg and the side surface Sps illustrated in FIG. 7, the vehicle shape model M and the virtual projection image Ip generated in the peripheral image generation unit 36 can be displayed and the three-dimensional projection image based on the peripheral image data when the fixation point En is seen from the viewpoint Ep set in the three-dimensional virtual space can be provided to the user.

The details of the correction ratio used to correct the projection position in the case where the image is projected on the virtual projection plane Sp are described below, and the difference in display content between when the projection position is not corrected and when the projection position is correct is also described.

First Embodiment

Figure 9:
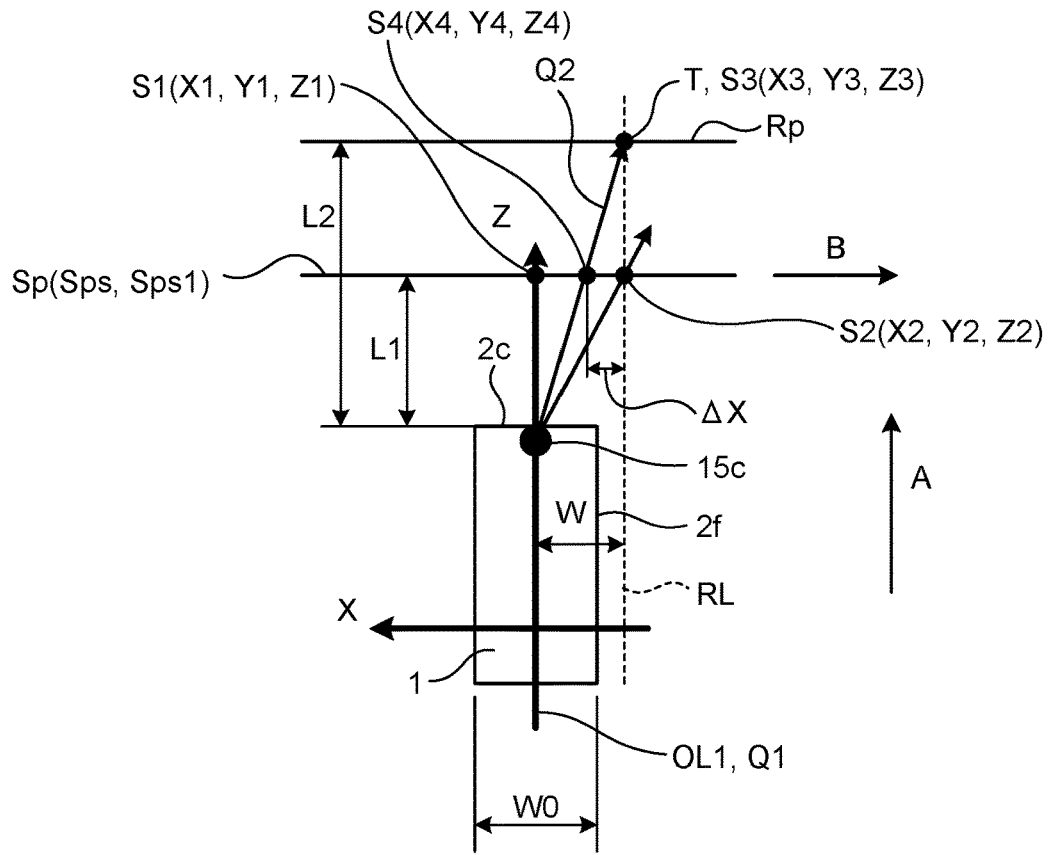
FIG. 9 is a schematic and exemplary explanatory view for describing a projection position of an image and calculation of a correction ratio in a display control system according to a first embodiment.

FIG. 9 is a schematic and exemplary explanatory view for describing the occurrence of a deviation phenomenon of the projection position in the case where the front image (display target image) captured by the image capture unit 15c (front image capture unit: process target image capture unit) is projected on the virtual projection plane Sp including only the side surface Sps1 as illustrated in FIG. 8, and the calculation of the correction ratio for reducing the deviation phenomenon.

In the description below, the image capture unit 15c (front image capture unit: process target image capture unit) that is provided to the end part 2c on the front of the vehicle 1 is mounted on a vehicle central line OL1 that extends in the vehicle length direction (front-rear direction) of the vehicle 1, and the straight line extending from the image capture unit 15c in the first direction A corresponding to the vehicle length direction along the vehicle central line OL1 is referred to as a first virtual straight line Q1. As such, in the first embodiment, the capture central line of the image capture unit 15c is one example of the first virtual straight line Q1 extending from the image capture unit 15c in the first direction A corresponding to the vehicle length direction of the vehicle 1. In addition, the first virtual straight line Q1 extends, for example, from the image capture unit 15c in the first direction A in parallel to the ground contact surface of the vehicle 1 (ground Gr). Moreover, it is assumed that the virtual projection plane (side surface Sps, Sps1) is set at a position apart by a predetermined distance L1 from the image capture unit 15c to the first direction A (first virtual straight line Q1). Furthermore, it is assumed that a virtual reference plane Rp is set at a position apart by a distance L2 determined in advance (predetermined distance) from the image capture unit 15c to the first direction A (first virtual straight line Q1) ahead of the virtual projection plane Sp. The position where the first virtual straight line Q1 and the virtual projection plane Sp intersect corresponds to a first coordinate point S1 (X1, Y1, Z1). As described above, the straight line extending in the first direction A apart from the first virtual straight line Q1 to the vehicle width direction of the vehicle 1 is referred to as a virtual reference line RL. In the case of the first embodiment, the virtual reference line RL is set at the position (on a vertical plane passing the door mirror 2g provided to the side surface of the vehicle 1) overlapping with one of the left and right side image capture units (image capture unit 15b or image capture unit 15d) in the vehicle width direction at the height equivalent to the height (height from ground) where the image capture unit 15c serving as the front image capture unit is provided, and additionally, the virtual reference line RL extends in the first direction A in parallel to the ground contact surface of the vehicle 1 (ground Gr). The virtual reference line RL can be set to the position apart from the vehicle central line OL1 by a predetermined distance W, for example, apart from the vehicle central line OL1 by equal to or more than a half (W0/2) of the vehicle width W0 to the outer side in the vehicle width direction. The position where the virtual reference line RL and the virtual projection plane Sp intersect is referred to as a second coordinate point S2 (X2, Y2, Z2). The virtual reference line RL can be set so as to extend in the first direction A. The position where the virtual reference line RL and the virtual reference plane Rp intersect is referred to as a third coordinate point S3 (X3, Y3, Z3).

For example, the case in which the object T existing at the position of the virtual reference plane Rp, that is, the object existing farther than the virtual projection plane Sp is projected on the virtual projection plane Sp as illustrated in FIG. 9 is considered. In FIG. 9, in order to make it easier to understand the change of the display position in the case where the object T is projected on the virtual projection plane Sp, the object T exists at the position where the virtual reference line RL and the virtual reference plane Rp intersect (third coordinate point S3 (X3, Y3, Z3)). In this case, even if the vehicle 1 goes straight, the vehicle 1 can avoid the object T without contacting with the object T.

Figure 10:
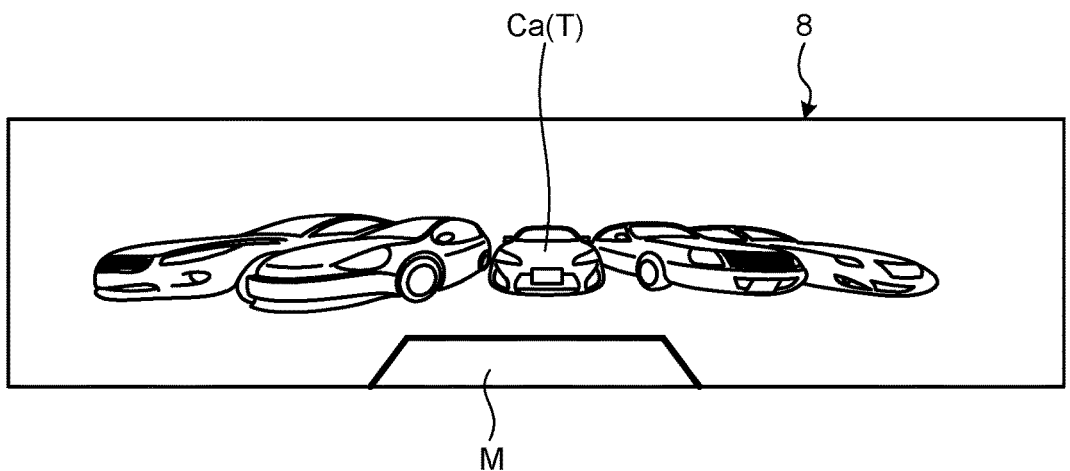
FIG. 10 is a schematic view illustrating a comparative example of a three-dimensional display image in a case where correction is not performed in the display control system according to the first embodiment.

First, the case in which the correction by the correction unit 30 is not performed is considered. For example, if the object T exists on the virtual reference plane Rp, the image for the third coordinate point S3 (X3, Y3, Z3) on the object T is projected on a fourth coordinate point S4 (X4, Y4, Z4) where the virtual projection plane Sp intersects with an extension line from the image capture unit 15c to the object T (a second virtual straight line Q2 corresponding to an extension line connecting between the third coordinate point S3 and the image capture unit 15c). In this case, the object T that the vehicle 1 can avoid when traveling straight is projected on the position near the first virtual straight line Q1 on the virtual projection plane Sp. That is to say, the object T is projected on the position where the object T is nearly in contact with the vehicle 1. In particular, in the case where the driver recognizes the size of the object or the width of the space that is present around the vehicle 1 including the object T, there are cases that the driver uses, as the criterion, the width of the vehicle 1 that he drives. Therefore, when the driver sees the object T that is projected on the position deviated to approach the first virtual straight line Q1 on the virtual projection plane Sp and is displayed as reduced-size, the driver wrongly recognizes the size or the position where the object T exists. FIG. 10 is a three-dimensional projection image as a comparison example that is displayed in the display device 8 in the case where the correction by the correction unit 30 is not performed. In this case, a vehicle Ca (object T) that is displayed in front of the vehicle (vehicle shape model M) is compressed toward the first virtual straight line Q1 (capture central line, see FIG. 9) and displayed to be viewed smaller. In this case, there are cases where the size of the vehicle Ca may wrongly recognized; and for example, if, after the vehicle Ca leaves the parking lot, the driver tries to park his car in that empty space, the display device 8 displays such that the space where the vehicle Ca existed looks narrow; therefore, it may be difficult for the driver of the vehicle 1 (driver's vehicle) to determine whether he can park his vehicle. Similarly, in the case where the road extending in the first direction A and having the unchanged road width is projected, there are cases where the suddenly narrowed road width is displayed, thereby giving the driver feeling of strangeness.

In this case, for example, the aforementioned unnatural projection is reduced by the correction performed in a manner that the fourth coordinate point S4 (X4, Y4, Z4) on the virtual projection plane Sp is projected on the second coordinate point S2 (X2, Y2, Z2) on the virtual projection plane Sp. That is to say, regarding the image to be projected on the right side of the first virtual straight line Q1 (capture central line), the correction unit 30 may obtain the correction ratio α for the coordinate to correct the projection position of the image to a second direction B from the first coordinate point S1 (X1, Y1, Z1) corresponding to the position where the first virtual straight line Q1 for the image capture unit 15c and the virtual projection plane Sp intersect to the second coordinate point S2 (X2, Y2, Z2) where the virtual reference line RL and the virtual projection plane Sp intersect as illustrated in FIG. 9. Similarly, regarding the image to be projected on the left side of the first virtual straight line Q1, the correction unit 30 may obtain the correction ratio α for the coordinate to correct the projection position of the image in the direction opposite to the second direction B. Note that since the left and right correction ratios α on the left and right sides can be made the same with the first virtual straight line Q1 interposed therebetween, only one side is described below.

First, the correction ratio α for the second coordinate point S2 (X2, Y2, Z2) for calculating the fourth coordinate point S4 (X4, Y4, Z4) for the two-dimensional coordinate (U, V) of the front image (display target image) captured by the image capture unit 15c that should be projected on the second coordinate point S2 (X2, Y2, Z2) on the virtual projection plane Sp is obtained. The two-dimensional coordinate (U, V) of the front image corresponding to the correction coordinate (αX, Y, Z) in which this correction ratio α is reflected only in the X component among the coordinate points of the virtual projection plane Sp may be obtained and projected on the coordinate on the virtual projection plane Sp where the image should originally be projected.

Various methods are given to calculate the correction ratio α. For example, the ratio between the distance ΔX (first distance) between the fourth coordinate point S4 (X4, Y4, Z4) existing in the second direction B on the virtual projection plane Sp and the second coordinate point S2 (X2, Y2, Z2), and the distance W (second distance) from the first virtual straight line Q1 (vehicle central line OL1) to the virtual reference line RL is used as the correction ratio α when the projection position is corrected to the second direction B.

From FIG. 9, the following expressions are obtained:

$$\alpha = \Delta X/W \qquad \text{Expression 1}$$

$$\Delta X/(L2-L1) = W/L2 \qquad \text{Expression 2}$$

That is to say, the above Expressions 1 and 2 provide the following Expression 3.

$$\alpha = (L2-L1)/L2 \qquad \text{Expression 3}$$

Thus, the correction ratio α can be easily defined based on the distance L1 to the virtual projection plane Sp and the distance L2 to the virtual reference plane Rp on the basis of the position of the image capture unit 15c.

Figure 11:
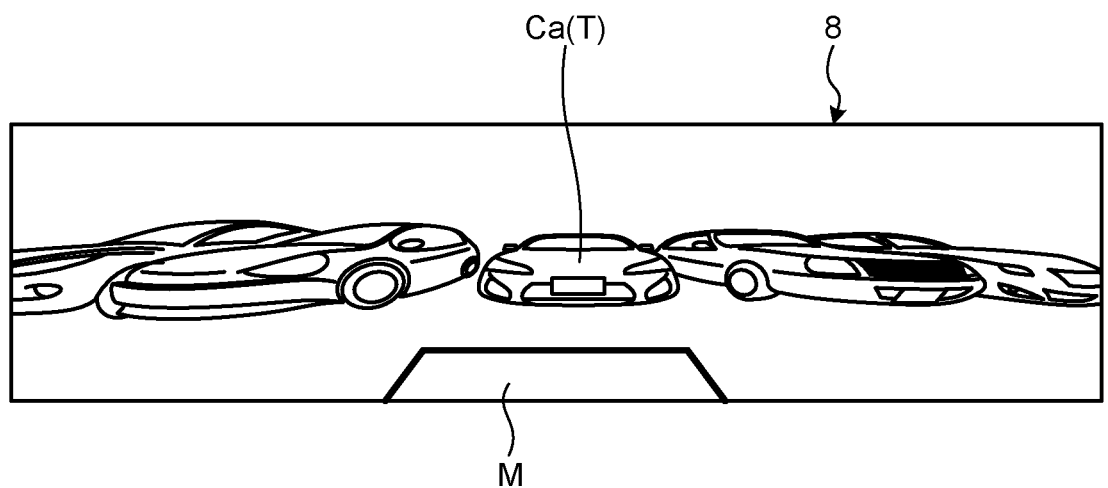
FIG. 11 is a schematic view illustrating a display example of a three-dimensional display image in a case where correction is performed in the display control system according to the first embodiment.

FIG. 11 is a three-dimensional synthetic image in which the projection position of the front image captured by the image capture unit 15c is corrected using the correction ratio α obtained in this manner. The correction unit 30 acquires the image of the two-dimensional coordinate (U, V) of the front image corresponding to the correction coordinate (αX, Y, Z) on the virtual projection plane Sp that is defined by the three-dimensional shape model on the basis of the correction ratio α. Then, the image is projected on the coordinate (X, Y, Z) on the virtual projection plane Sp. As a result, as illustrated in FIG. 11, the vehicle Ca (object T) displayed in front of the vehicle (vehicle shape model M) is extended to the left and right on the basis of the first virtual straight line Q1 (capture central line) and is displayed to have the size with reduced feeling of strangeness compared to the vehicle (vehicle shape model M). For example, the image on the right side of the first virtual straight line Q1 is extended to the second direction B and the image on the left side of the first virtual straight line Q1 is extended to the direction opposite to the second direction B. In this case, for example, if the vehicle Ca leaves the parking lot and then the driver tries to park his car in that parking lot, the display device 8 displays the parking lot having the width with reduced feeling of strangeness compared to the vehicle (vehicle shape model M) and thus, the driver of the vehicle 1 (driver's vehicle) can easily determine whether he can park his vehicle there. Similarly, the change of the road width of the road extending in the first direction A (to the front) becomes gradient, enabling making the driver feel less strange. In this case, the object T that exists on the extension line of the virtual reference line RL, that is, at the position corresponding to the vehicle width of the vehicle 1 is displayed on the virtual reference line RL also on the virtual projection plane Sp; therefore, the driver who sees the three-dimensional synthetic image displayed in the display device 8 can easily recognize the positional relation between the vehicle and the object T.

As described above in the first embodiment, the first virtual straight line Q1 extends in the first direction A in parallel to the ground contact surface (ground Gr) of the vehicle 1 from the front image capture unit (image capture unit 15c). In addition, the virtual reference line RL extends in the first direction A in parallel to the ground contact surface (ground Gr) of the vehicle 1 from the position overlapping with any one of the left and right side image capture units (image capture units 15b and 15d) in the vehicle width direction and the height where the front image capture unit (image capture unit 15c) is provided. Therefore, the first virtual straight line Q1 and the virtual reference line RL extend in parallel to each other in the first direction apart from each other in the vehicle width direction when viewed from above vertically, and extend overlapping with each other when viewed from the side of the vehicle 1. In this manner, by aligning the height of the first virtual straight line Q1 and the height of the virtual reference line RL, the coordinates in the height direction become the same in the first coordinate point S1 to the fourth coordinate point S4. Therefore, when the correction ratio α is calculated using the first distance and the second distance (Expressions 1 to 3), the correction ratio α can be obtained stably and the correction using the correction ratio α can be achieved stably without an influence from the coordinate in the height direction.

Figure 12:
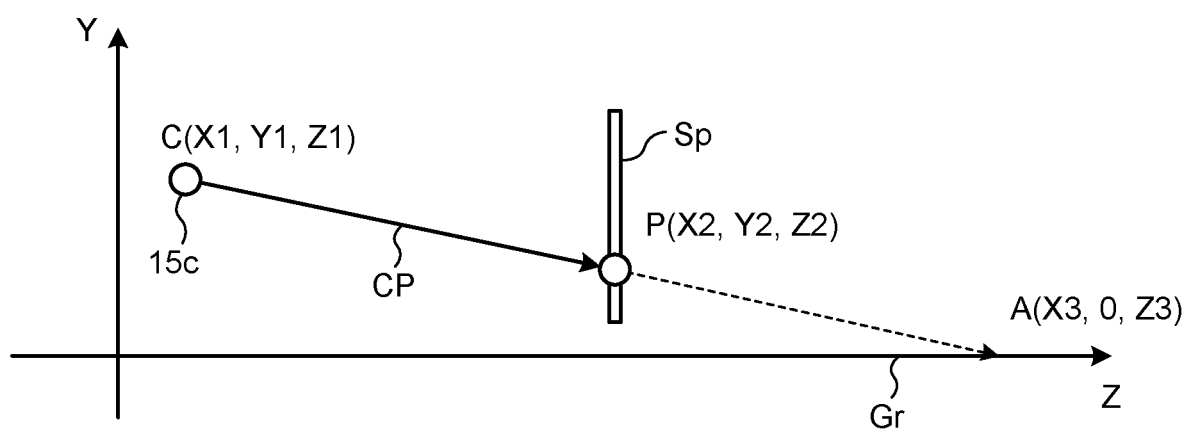
FIG. 12 is a diagram for describing another method of calculating the correction ratio in the display control system according to the first embodiment and also an explanatory view illustrating an intersection coordinate between a position coordinate of an image capture unit and a virtual projection plane and an intersection coordinate with a road surface.
Figure 13:
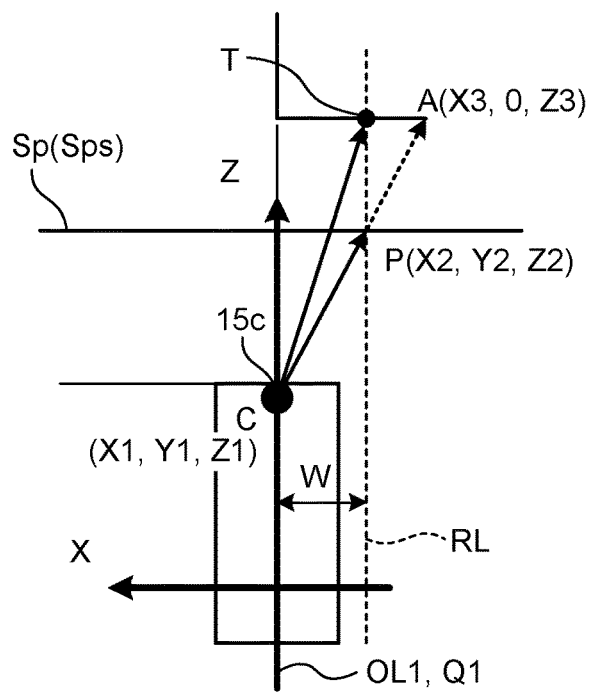
FIG. 13 is a diagram for describing another method of calculating the correction ratio in the display control system according to the first embodiment and also an explanatory view for describing an example of obtaining the correction ratio using the coordinates in FIG. 12.

FIG. 12 and FIG. 13 are diagrams for describing another method of calculating the correction ratio α. In FIG. 12, a coordinate C (X1, Y1, Z1) is the position of the image capture unit 15c. In addition, a coordinate P (X2, Y2, Z2) is an arbitrary point on the virtual projection plane Sp. A coordinate A (X3, 0, Z3) is the intersection between a straight line CP and the ground Gr. In this case, the straight line CP passing the coordinate C and the coordinate P can be expressed by the following expression (vector formula) in which t represents a parameter.

[Formula 1]

$$\vec{CP} = \vec{C} + t(\vec{P} - \vec{C})$$ (Expression 4)

Then, the coordinate A on the ground Gr existing on the extension of the straight line CP in FIG. 12 is obtained.

[Formula 2]

$$\begin{pmatrix} X3 \\ 0 \\ Z3 \end{pmatrix} = \begin{pmatrix} X1 \\ Y1 \\ Z1 \end{pmatrix} + t \begin{pmatrix} X2 - X1 \\ Y2 - Y1 \\ Z2 - Z1 \end{pmatrix}$$ (Expression 5)

Thus, $t = -Y1/(Y2 - Y1)$ $X3 = X1 + t(X2 - X1)$ $Z3 = Z1 + t(Z2 - Z1)$ are satisfied. In this case, the image projected on the coordinate P on the virtual projection plane Sp is the image for the coordinate A as illustrated in FIG. 13. In a manner similar to the case described with reference to FIG. 9, the correction ratio α to project the object T existing on the virtual reference line RL to the coordinate P on the virtual projection plane Sp can be obtained based on the relation between the distance W from the first virtual straight line Q1 (vehicle central line OL1) to the virtual reference line RL and the coordinate X3 of the coordinate A.

$\alpha = W/X3$

Correcting the projection position of the front image captured by the image capture unit 15c using the correction ratio α can obtain the three-dimensional synthetic image similar to that in FIG. 11. In the case of the examples illustrated in FIG. 12 and FIG. 13, the intersection between the straight line CP and the ground Gr can be obtained at the position below the height of the image capture unit 15c (the height from the ground) in the virtual projection plane Sp.

That is to say, the correction ratio α at each height on the virtual projection plane Sp can be calculated and the correction in accordance with the height from the ground Gr becomes possible; thus, the three-dimensional image that makes the driver feel less discomfort can be displayed. In addition, in the virtual projection plane Sp, the correction ratio α at or above the height where the image capture unit 15c is set may be a predetermined value, for example the maximum correction ratio αmax that can be calculated at maximum.

In this manner, in the case where the virtual projection plane Sp is the upright plane in front of the vehicle and the display device 8 displays the three-dimensional synthetic image using only the front image captured by the image capture unit 15c (front image capture unit), unnaturally small displaying of the circumstance in front of the vehicle (other vehicles or road, for example) or displaying of the road whose width suddenly becomes narrow can be reduced. As a result, by the three-dimensional synthetic image displayed in the display device 8, the driver can easily recognize the circumstance around his vehicle, mainly ahead of the vehicle, as appropriate without a sense of strangeness. Note that the three-dimensional synthetic image representing the circumstance behind the vehicle using the rear image captured by the image capture unit 15a (rear image capture unit) can be generated similarly and thus, the driver can also easily recognize the circumstance around his vehicle, mainly behind the vehicle, as appropriate without a sense of strangeness.

Note that every time the ignition switch is turned on, the correction unit 30 can calculate the correction ratio α for the image capture unit 15c, store the correction ratio α in the RAM 14c, and correct the projection position of each image every time the three-dimensional synthetic image is generated.

Second Embodiment

Figure 14:
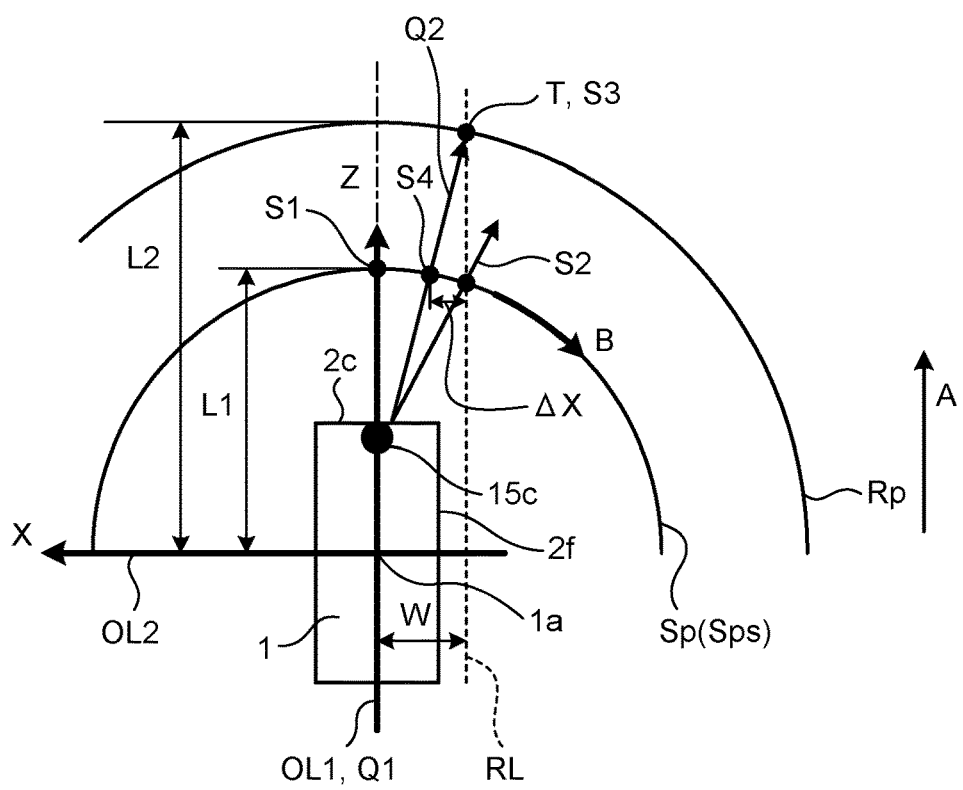
FIG. 14 is a schematic and exemplary explanatory view for describing a projection position of a front image and calculation of a correction ratio in a display control system according to a second embodiment.

FIG. 14 is a schematic and exemplary explanatory view for describing the projection position of the front image and the calculation of the correction ratio in accordance with a second embodiment. In the case of the second embodiment, the shape of the virtual projection plane Sp that is set in front of the vehicle 1 (vehicle) is a curved plane whose center corresponds to a vehicle center 1a of the vehicle 1. The structure other than this point is the same as that illustrated in FIG. 9 in the first embodiment, and by denoting the same structure with the same reference sign, the detailed description is omitted. However, in FIG. 14, the distance L1 to the virtual projection plane Sp and the distance L2 to the virtual reference plane Rp are defined based on a central line OL2 extending in the vehicle width direction passing the vehicle center 1a of the vehicle 1.

In the case of FIG. 14, similarly, the virtual reference line RL (straight line extending in the first direction A along the end part 2f corresponding to the side surface of the vehicle 1 and existing apart from the first virtual straight line Q1 (capture central line) to the vehicle width direction by the distance W) is defined. In this case, the first virtual straight line Q1 may also be set to extend in the first direction A in parallel to the ground contact surface of the vehicle 1 (ground Gr) from the front image capture unit (image capture unit 15c). In addition, the virtual reference line RL may be set to extend in the first direction A in parallel to the ground contact surface of the vehicle 1 (ground Gr) from the position overlapping with any one of the left and right side image capture units (image capture units 15b and 15d) in the vehicle width direction and the height where the front image capture unit (image capture unit 15c) is provided. Then, in the case where the virtual projection plane Sp is the curved plane, if the correction by the correction unit 30 is not performed, the image for the third coordinate point S3 of the object T existing at the intersection between the virtual reference line RL and the virtual reference plane Rp captured by the image capture unit 15c is projected on the fourth coordinate point S4 where the virtual projection plane Sp intersects with the second virtual straight line Q2 (extension line) from the image capture unit 15c fixed at a central part of the end part 2c on the front side of the vehicle 1 to the object T. Therefore, in a manner similar to the case described with reference to FIG. 9, the vehicle Ca (object T) displayed in front of the vehicle 1 (vehicle shape model M) is compressed toward the first virtual straight line Q1 (capture central line) and displayed small. Similarly, in the case where the road extending in the first direction A and having the road width unchanged is projected, the road is displayed with the road width suddenly reduced and the driver may feel strange. In view of this, in the case where the virtual projection plane Sp of the curved plane in the second embodiment is used, the correction unit 30 also calculates a correction ratio αf for the front image and based on this correction ratio αf, acquires the image at the two-dimensional coordinate (U, V) of the front image for the correction coordinate (αfX, Y, Z) on the virtual projection plane Sp defined by the three-dimensional shape model. Then, the image is projected on the coordinate (X, Y, Z) on the virtual projection plane Sp. For example, the ratio between the distance ΔX (first distance) between the fourth coordinate point S4 existing in the second direction B on the virtual projection plane Sp and the second coordinate point S2, and the distance W (second distance) from the first virtual straight line Q1 (vehicle central line OL1) to the virtual reference line RL is used as the correction ratio αf when the projection position is corrected to the second direction B (direction from the first coordinate point S1 to the second coordinate point S2).

From FIG. 14, the following expressions are obtained:

$$\alpha f = \Delta X/W \quad \text{Expression 1f}$$

$$\Delta X/(L2-L1) = W/L2 \quad \text{Expression 2f}$$

That is to say, Expression 1f and Expression 2f provide the following Expression 3f:

$$\alpha f = (L2-L1)/L2 \quad \text{Expression 3f}$$

In this manner, the correction ratio αf can be easily defined based on the distance L1 to the virtual projection plane Sp and the distance L2 to the virtual reference plane Rp on the basis of the position of the image capture unit 15c. In the three-dimensional synthetic image corrected using the correction ratio αf, the vehicle Ca (object T) displayed in front of the vehicle (vehicle shape model M) is extended to the left and right on the basis of the first virtual straight line Q1 (capture central line) and is displayed to have the size that makes the driver feel less strange than the vehicle (vehicle shape model M) like in FIG. 11. Moreover, the change of the road width of the road extending in the front changes becomes gradient so that the driver feels less strange. In this manner, by aligning the height of the first virtual straight line Q1 and the height of the virtual reference line RL in the second embodiment, the coordinates in the height direction become the same in the first coordinate point S1 to the fourth coordinate point S4. Therefore, when the correction ratio αf is calculated using the first distance and the second distance (Expressions 1f to 3f), the stable correction ratio αf can be obtained and the stable correction using the correction ratio αf can be realized without an influence from the coordinate in the height direction.

Figure 15:
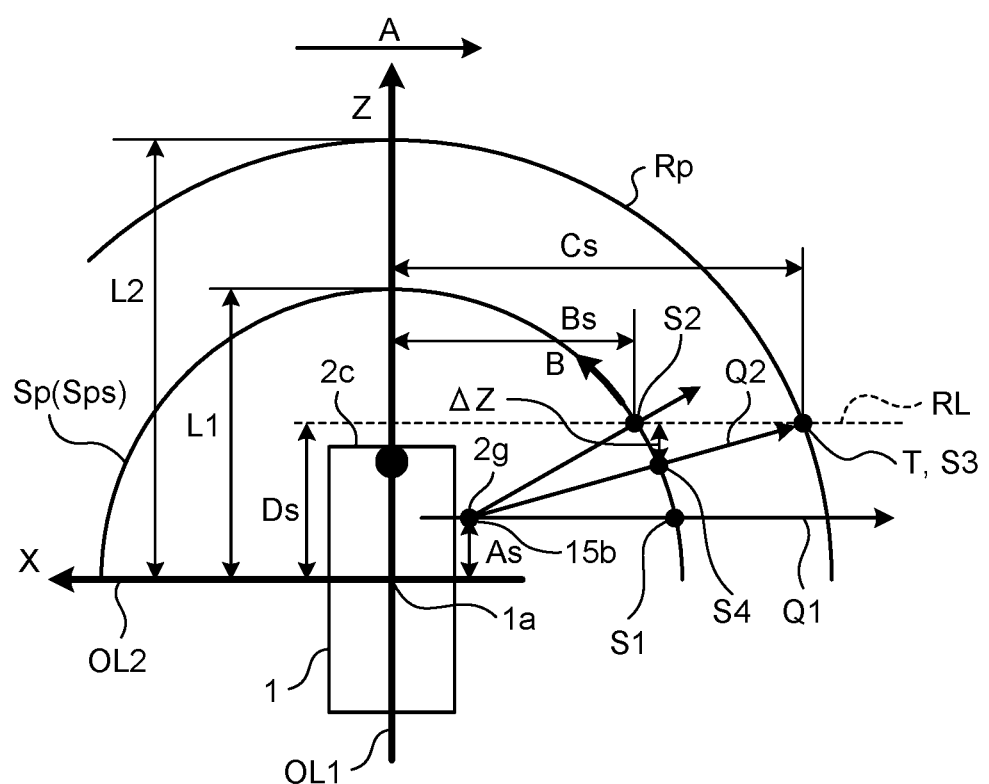
FIG. 15 is a schematic and exemplary explanatory view for describing a projection position of a side image and calculation of the correction ratio in the display control system according to the second embodiment.

FIG. 15 is a schematic and exemplary explanatory view for describing the calculation of a correction ratio αs in a case where the three-dimensional synthetic image representing the circumstance on the right side is generated using the right side image (display target image) captured by the image capture unit 15b (right side image capture unit: process target image capture unit). In this case, the structure is the same as that in FIG. 14 except that the image capture unit 15c (front image capture unit) is replaced by the image capture unit 15b (right side image capture unit) and by denoting the same structure with the same reference sign, the detailed description is omitted. Note that the image capture unit 15b (right side image capture unit) may be placed vertically downward at the end part 2f of the vehicle 1. In this case, the capture central line of the image capture unit 15b is directed downward vertically. Therefore, when the side image is the display target image as described in the second embodiment, the peripheral region of the image captured by a wide-angle lens or a fisheye lens is mainly used. In the case of using the image capture unit 15b (right side image capture unit), the vehicle width direction of the vehicle 1 from the image capture unit 15b corresponds to the first direction A. Then, the straight line extending from the image capture unit 15b to the first direction A is referred to as the first virtual straight line Q1. In this case, the first virtual straight line Q1 may be set to extend in the first direction A in parallel to the ground contact surface (ground Gr) of the vehicle 1 from the image capture unit 15b. Then, the position where the first virtual straight line Q1 and the virtual projection plane Sp intersect is referred to as the first coordinate point S1. In the case of using the image capture unit 15b, the virtual reference line RL may be set at the position (on a vertical plane passing the end part 2c on the front side of the vehicle 1 (the front surface of the vehicle body)) overlapping with the front image capture unit (image capture unit 15a) in the vehicle length direction at the height equal to the height where the right side image capture unit (image capture unit 15b) is provided, and additionally, the virtual reference line RL may extend in the first direction A in parallel to the ground contact surface of the vehicle 1 (ground Gr). In FIG. 15, the distance to be referred to in the calculation is defined on the basis of the vehicle central line OL1 extending in the vehicle length direction of the vehicle 1 passing the vehicle center 1a of the vehicle 1 and the vehicle central line OL2 extending in the vehicle width direction passing the vehicle center 1a. For example, the position of the image capture unit 15b (right side image capture unit) is defined based on a distance As from the central line OL2. In addition, the second coordinate point S2 is defined based on a distance Bs from the vehicle central line OL1 and the third coordinate point S3 is defined based on a distance Cs from the vehicle central line OL1. The position of the virtual reference plane Rp is defined based on a distance Ds from the central line OL2.

In the case where the three-dimensional synthetic image is generated using the right side image captured by the image capture unit 15b (right side image capture unit), if the correction by the correction unit 30 is not performed, the image for the third coordinate point S3 on the object T existing on the virtual reference plane Rp is projected on the fourth coordinate point S4 where the virtual projection plane Sp (Sps) intersects with the second virtual straight line Q2 (extension line) from the image capture unit 15b fixed at the door mirror 2g of the vehicle 1 to the object T. Therefore, in a manner similar to the case described with reference to FIG. 9 and FIG. 14, the vehicle Ca (object T) displayed on the right side of the vehicle 1 (vehicle shape model M) is compressed toward the first virtual straight line Q1 and displayed small. Similarly, in the case where the road having the road width unchanged in the first direction A (to the side of the vehicle) is projected, the road is displayed with the road width suddenly reduced and the driver may feel strange. For example, a pedestrian existing ahead of the end part 2c of the vehicle 1 on the right side of the vehicle 1 (vehicle) is displayed unnaturally, that is, displayed as if the pedestrian existed behind the end part 2c on the three-dimensional synthetic image.

In view of this, the correction unit 30 calculates the correction ratio $\alpha s$ for the right side image, and acquires, based on this correction ratio $\alpha s$, the image at the two-dimensional coordinate (U, V) of the right side image for the correction coordinate ($\alpha s$X, Y, Z) on the virtual projection plane Sp defined by the three-dimensional shape model. Then, the image is projected on the coordinate (X, Y, Z) on the virtual projection plane Sp. For example, the ratio between the distance $\Delta Z$ (first distance) between the second coordinate point S2 and the fourth coordinate point S4 existing in the second direction B (direction from the first coordinate point S1 to the second coordinate point S2) on the virtual projection plane Sp, and the distance (Ds−As) corresponding to the second distance from the first virtual straight line Q1 to the virtual reference line RL may be used as the correction ratio $\alpha s$ when the projection position is corrected to the second direction B.

From FIG. 15, the following expressions are obtained:

$\alpha s = \Delta Z/(Ds-As)$   Expression 1s $\Delta Z/(Cs-Bs) = (Ds-As)/C$   Expression 2s That is to say, the above Expressions 1s and 2s provide the following Expression 3s:

$\alpha s = (Cs-Bs)/Cs$   Expression 3s

From FIG. 15, the following expressions are obtained:

$B = \sqrt{(L1^2 - Ds^2)}$ $C = \sqrt{(L2^2 - Ds^2)}$

In this manner, the correction ratio $\alpha s$ can be easily defined based on the distance L1 to the virtual projection plane Sp and the distance L2 to the virtual reference plane Rp on the basis of the position of the central line OL2. In the three-dimensional synthetic image corrected using the correction ratio $\alpha s$, the vehicle (object T) displayed on the right side of the vehicle (vehicle shape model M) is extended to the front and rear on the basis of the first virtual straight line Q1 and is displayed to have the size that makes the driver feel less strange than the vehicle (vehicle shape model M). Moreover, the change of the road width of the road extending to the right side of the vehicle 1 becomes gradient so that the driver feels less strange. If a pedestrian exists, for example, the pedestrian is displayed at the position close to the actual position. Note that the similar correction is possible when the three-dimensional synthetic image is generated using the left side image captured by the image capture unit 15d (left side image capture unit), and the similar effect can be obtained. In this case, the height of the first virtual straight line Q1 and the height of the virtual reference line RL can be aligned and the coordinates in the height direction become the same in the first coordinate point S1 to the fourth coordinate point S4. Therefore, when the correction ratio $\alpha s$ is calculated using the first distance and the second distance (Expressions 1s to 3s), the correction ratio $\alpha s$ can be obtained stably and the correction using the correction ratio $\alpha s$ can be achieved stably without an influence from the coordinate in the height direction.

Note that, regarding the region behind the first virtual straight line Q1 with respect to the image capture unit 15b, the correction to reduce the sense of strangeness can be performed similarly by setting the virtual reference line RL along the first direction A at the end part 2e on the rear side of the vehicle 1 (rear surface of the vehicle body). If the image capture unit 15b (image capture unit 15d) is set to face not in the vertical direction but to the side like the image capture unit 15c, the first coordinate point S1 can be defined by using the capture central line of the image capture unit 15b (image capture unit 15d) that faces the right side (left side) as the first virtual straight line Q1.

Figure 16:
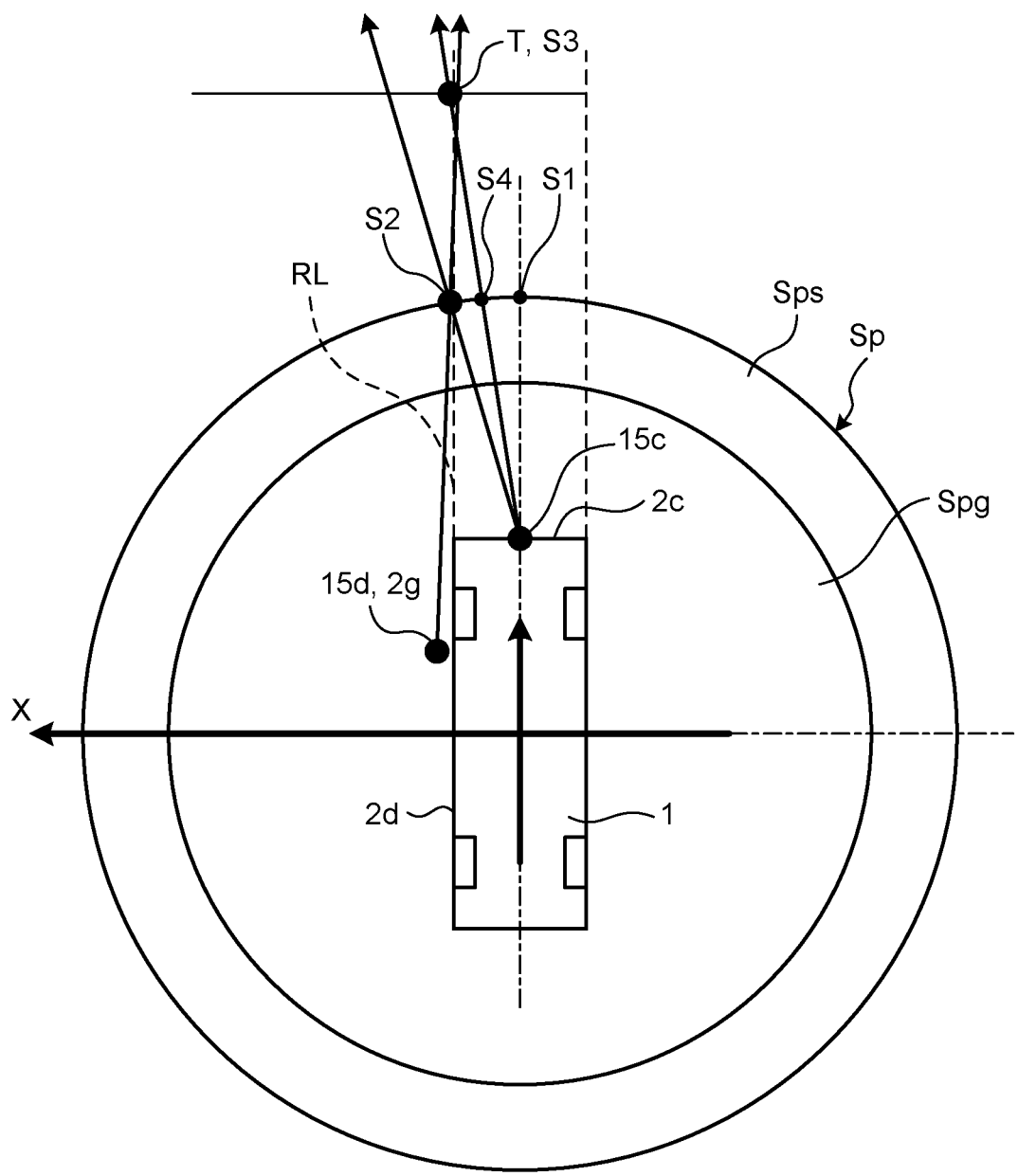
FIG. 16 is a schematic and exemplary explanatory view for describing that double reflection occurs when an image is projected using a front image and a side image and the double reflection can be reduced in the display control system according to the second embodiment.

The image synthesis unit 32 can generate the three-dimensional synthetic image representing a wider region by connecting the images captured by the image capture units 15 as described above. For example, the right side image and the left side image can be connected to the right and left sides of the front image, so that the synthetic image is formed. In this case, if the correction by the correction unit 30 is not performed, the unnatural image may be displayed. For example, the case as illustrated in FIG. 16 is considered in which the circumstance around the vehicle 1 is captured using the image capture unit 15c disposed at the end part 2c on the front side of the vehicle 1 and the image capture unit 15d disposed at the door mirror 2g on the left side of the vehicle 1. Note that FIG. 16 illustrates an example of projecting another image, that is, an example of projecting a three-dimensional synthetic image using the virtual projection plane Sp including the bottom surface Spg and the side surface Sps as illustrated in FIG. 7.

In FIG. 16, the object T exists at a position farther than the virtual projection plane Sp (side surface Sps) and the front image captured by the image capture unit 15c and the left side image captured by the image capture unit 15d are synthesized. It is assumed that the object T exists on the virtual reference line RL extending along the end part 2d on the left side of the vehicle 1. In this case, the image capture unit 15d is set to the position close to the virtual reference line RL; therefore, if the two-dimensional coordinate (U, V) for the third coordinate point S3 of the object T reflecting in the image captured by the image capture unit 15d is projected on the virtual projection plane Sp (side surface Sps), the coordinate is projected on the coordinate that substantially corresponds to (with little deviation in the projection) the position where the object T exists (correct position). For example, the coordinate is projected on the second coordinate point S2.

Figure 17:
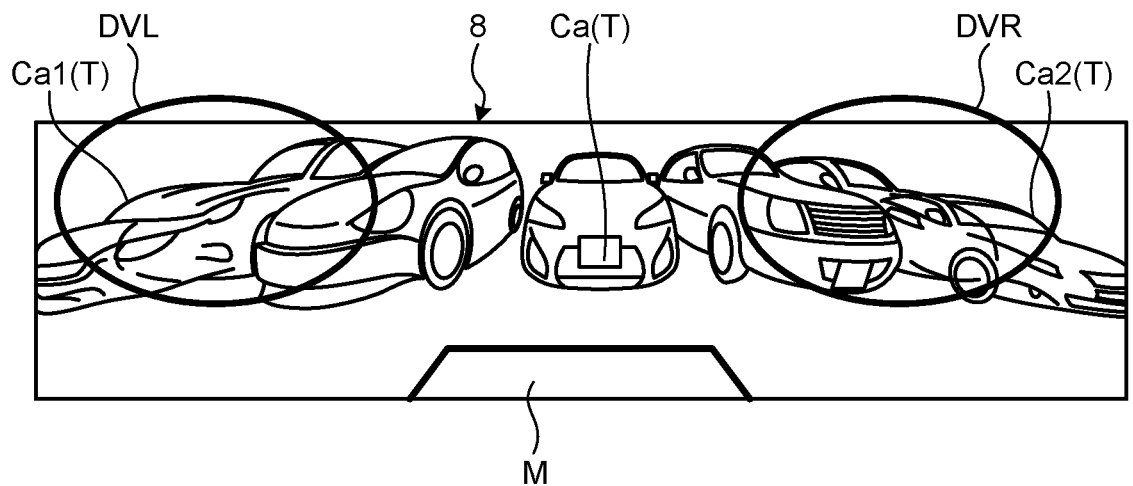
FIG. 17 is a schematic view illustrating a comparative example of a three-dimensional display image in a case where correction is not performed in the display control system according to the second embodiment.

On the other hand, in the case where the two-dimensional coordinate (U, V) for the third coordinate point S3 of the object T reflecting in the image captured by the image capture unit 15c is projected on the virtual projection plane SP (side surface Sps) and the correction by the correction unit 30 is not performed, the coordinate is projected on the fourth coordinate point S4. That is to say, "double reflection" occurs: one object T is projected on the different points on the virtual projection plane Sp (the second coordinate point S2 and the fourth coordinate point S4). FIG. 17 illustrates one example of the three-dimensional synthetic image displayed in the display device 8 in the case where the correction by the correction unit 30 is not performed. In this case, in the three-dimensional synthetic image, the same vehicle Ca1 (object T) is reflected doubly in a joined region DVL of the image capture unit 15c (front image capture unit) and the image capture unit 15d (left side image capture unit). Similarly, the same vehicle Ca2 (object T) is reflected doubly around a joined region DVR of the image capture unit 15c (front image capture unit) and the image capture unit 15b (right side image capture unit). Note that since the correction by the correction unit 30 is not performed, the vehicle Ca displayed in front of the vehicle (vehicle shape model M) is displayed small like in the example illustrated in FIG. 10.

Figure 18:
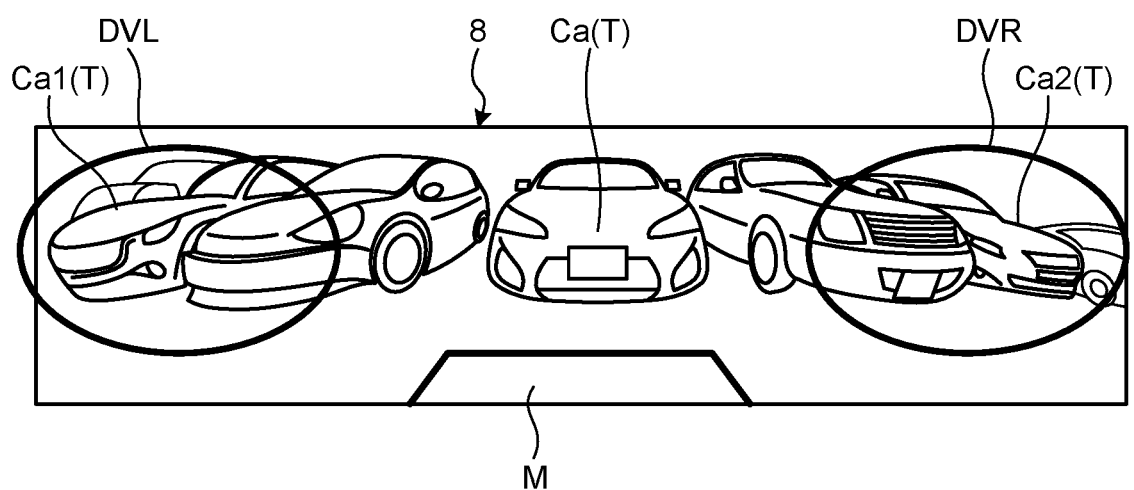
FIG. 18 is a schematic view illustrating a display example of a three-dimensional display image in a case where the correction is performed in the display control system according to the second embodiment.

FIG. 18 illustrates a display example in the case where the three-dimensional synthetic image corrected by the correction unit 30 is displayed in the display device 8. Note that in the example illustrated in FIG. 18, the object T in the display target image of the side captured by the image capture unit 15d (left side image capture unit) is, if projected on the virtual projection plane Sp, projected on an approximately correct position, so that the correction by the correction unit 30 is not performed. In the example illustrated in FIG. 18, the correction unit 30 corrects the display target image captured by the image capture unit 15c (front image capture unit) only in the X direction.

As a result of performing the correction by the correction unit 30, the two-dimensional coordinate (U, V) for the third coordinate point S3 of the object T reflecting in the display target image captured by the image capture unit 15c (front image capture unit) is corrected in the direction from the first coordinate point S1 to the second coordinate point S2. As a result, the image (object T) captured by the image capture unit 15c (front image capture unit) is corrected to get closer to the position (second coordinate point S2) where the two-dimensional coordinate (U, V) for the third coordinate point S3 of the object T reflecting in the side display target image captured by the image capture unit 15d (left side image capture unit) is projected. That is to say, the projection positions become closer to each other and the double reflection is reduced (becomes less visible). As a result, the vehicle Ca1 in the joined region DVL and the vehicle Ca2 in the joined region DVR are displayed more clearly (in the example of FIG. 18, the double reflection has been solved). Note that since the correction in the X direction is performed about the image captured by the image capture unit 15c (front image capture unit), the vehicle Ca displayed in front of the vehicle (vehicle shape model M) has the size that makes the driver feel less strange than that of the vehicle (vehicle shape model M) like in the example illustrated in FIG. 11.

By such correction of the correction unit 30, the unnaturalness in displaying can be reduced in the case where the virtual projection plane Sp has the curved surface shape surrounding the vehicle and the display device 8 displays the three-dimensional synthetic image using the images captured by the image capture unit 15c (front image capture unit), the image capture unit 15d (left side image capture unit), and the image capture unit 15b (right side image capture unit). That is to say, the double reflection can be made less visible and the unnaturally small display of the circumstance in front of the vehicle (other vehicle, road, and the like) or the display of the road whose road width suddenly becomes narrow can be reduced. As a result, by the three-dimensional synthetic image displayed in the display device 8, the driver can easily recognize the circumstance around his vehicle, mainly ahead of the vehicle, as appropriate without a sense of strangeness. Note that this similarly applies when the display target image captured by the image capture unit 15c and the display target image on the right side captured by the image capture unit 15b are connected, and the similar effect can be obtained. Moreover, this similarly applies when the display target image captured by the image capture unit 15a and the display target image on the side captured by the image capture unit 15b (the image capture unit 15d) are connected, and the similar effect can be obtained. In this case, as described above in the first embodiment, the height of the first virtual straight line Q1 and the height of the virtual reference line RL can be aligned and the coordinates in the height direction become the same in the first coordinate point S1 to the fourth coordinate point S4. Therefore, when the correction ratio α is calculated using the first distance and the second distance (Expressions 1 to 3), the correction ratio α can be obtained stably and the correction using the correction ratio α can be achieved stably without an influence from the coordinate in the height direction.

Third Embodiment

Figure 19:
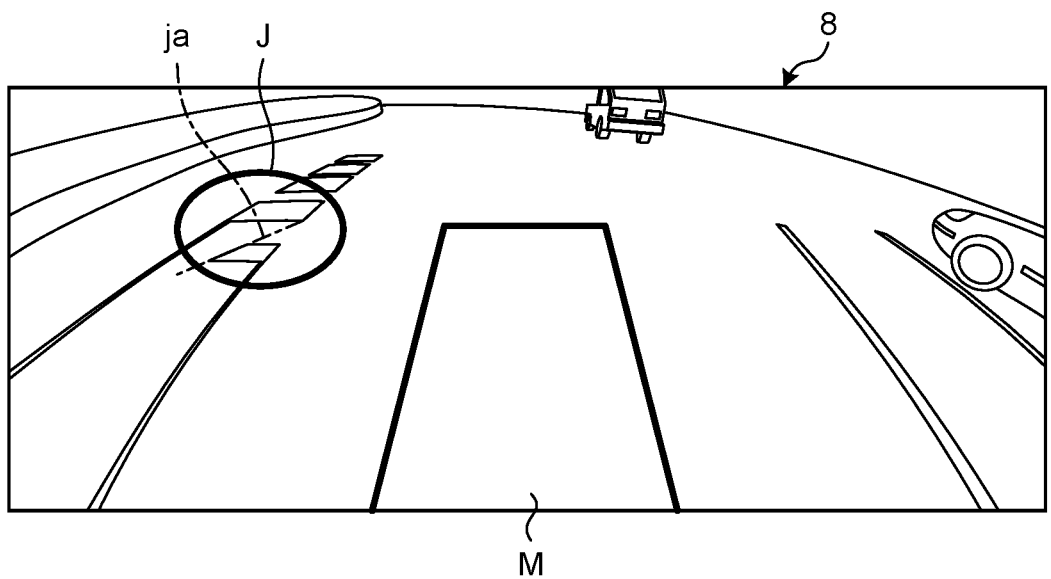
FIG. 19 is a schematic view illustrating one example of a display deviation that can occur newly when the correction is performed in the display control system according to the second embodiment.

In the case where the virtual projection plane Sp is formed by the bottom surface Spg and the side surface Sps like in the example illustrated in FIG. 16, if the correction unit 30 corrects the virtual projection plane Sp (side surface Sps) as described above, the image deviation may occur in the border line part between the bottom surface Spg and the side surface Sps. For example, in the case where the correction is performed in a manner that the left side image is extended to the vehicle front-rear direction using the correction ratio αs, the influence of the correction in the side surface Sps part appears remarkably. In one example illustrated in FIG. 19, the white line on the road surface deviates in a border line ja part between the side surface Sps and the bottom surface Spg in the area indicated by a region J.

Figure 20:
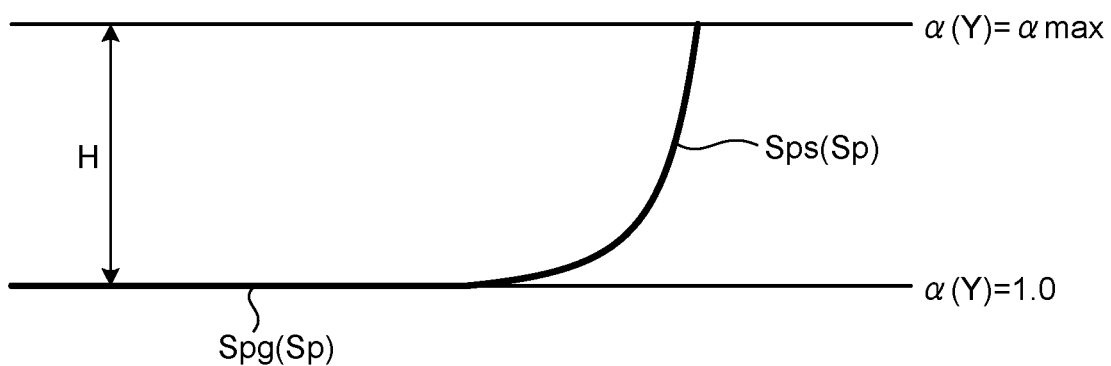
FIG. 20 is an explanatory view for describing an application example of a correction ratio in a display control system according to a third embodiment.

In view of this, in the third embodiment, the value of the correction ratio α is changed in accordance with the height Y of the side surface Sps so that the bottom surface Spg and the side surface Sps become continuous for sure as illustrated in FIG. 20. For example, in the connection part (the height of the side surface Sps=0), the correction ratio α(Y) is set to 1.0 (the correction is not reflected) and the correction ratio is maximized (αmax) at an upper end part of the side surface Sps (height H). Note that the maximum correction ratio αmax is the correction ratio α calculated in the first and the second embodiments, for example. That is to say, the correction ratio α(Y) in the height Y can be expressed by the following Expression 6:

$$\text{Correction ratio } \alpha(Y) = 1.0 - (1.0 - \alpha max)Y/H \qquad \text{Expression 6}$$

Figure 21:
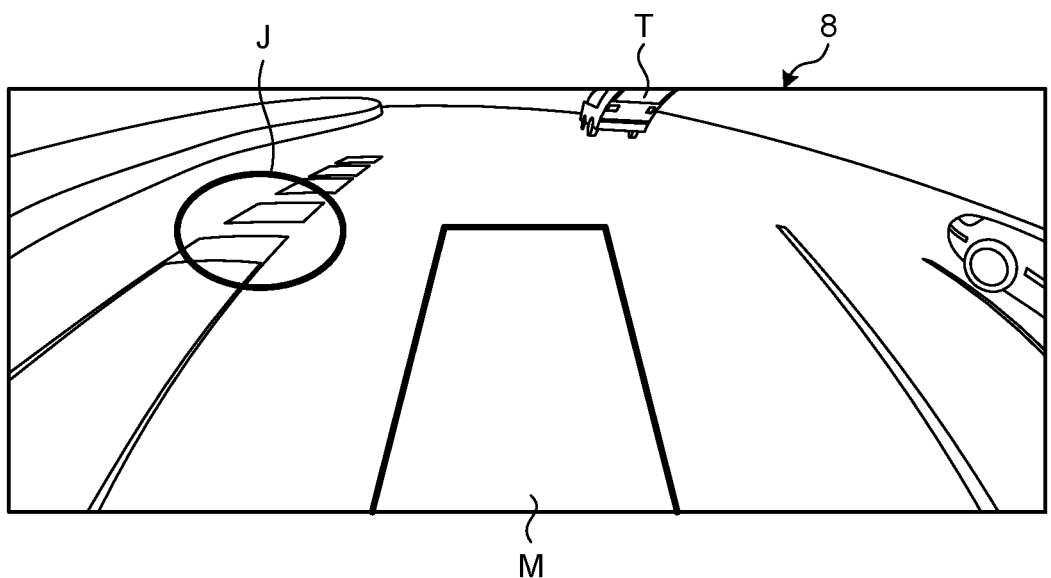
FIG. 21 is a schematic view illustrating a display example of a three-dimensional display image in a case where the correction ratio in the display control system according to the third embodiment is applied.

FIG. 21 is the three-dimensional synthetic image in which the correction unit 30 corrects the projection position of the left side image captured by the image capture unit 15d using the correction ratio α(Y). The correction unit 30 acquires the image of the two-dimensional coordinate (U, V) of the left side image for the correction coordinate (α(Y)X, Y, Z) on the side surface Sps defined by the three-dimensional shape model on the basis of the correction ratio α(Y). Then, the image is projected on the coordinate (X, Y, Z) on the side surface Sps. As a result, the side surface Sps is gradually corrected from the bottom surface Spg so that the three-dimensional synthetic image in which the bottom surface Spg and the side surface Sps are smoothly connected and the image deviation is made less visible can be generated as indicated by the region J in FIG. 21. As a result, by the three-dimensional synthetic image displayed in the display device 8, the driver can easily recognize the circumstance around his vehicle, mainly ahead of the vehicle, as appropriate without a sense of strangeness. This similarly applies to the front image captured by the image capture unit 15*c* (front image capture unit). By the use of the correction ratio α(Y), the image deviation in the border portion between the bottom surface Spg and the side surface Sps is made less visible and the three-dimensional synthetic image that does not make the driver feel strange can be displayed.

Fourth Embodiment

In the third embodiment, by the use of the correction ratio α(Y), the image deviation in the border portion between the bottom surface Spg and the side surface Sps can be reduced; however, the correction ratio becomes the maximum correction ratio αmax at the upper end part of the side surface Sps and thus, the displayed object T may become more inclined as the object T gets closer to the upper part of the side surface Sps as illustrated in FIG. 21. In FIG. 21, the object T (vehicle) displayed on the right side of the front surface of the vehicle (vehicle shape model M) is displayed inclined to the right.

Figure 22:
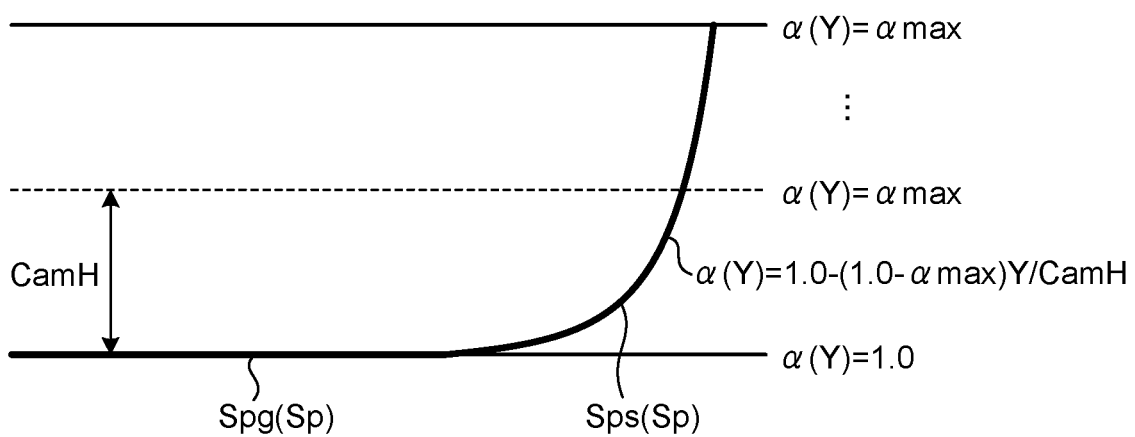
FIG. 22 is an explanatory view for describing another application example of a correction ratio in a display control system according to a fourth embodiment.

In view of this, in a fourth embodiment, in the case where the value of the correction ratio α is changed in accordance with the height Y of the side surface Sps, the correction ratio α(Y) is determined so that the correction ratio α(Y) becomes the maximum correction ratio αmax at the height CamH of the image capture unit 15 and above that, the maximum correction ratio αmax is maintained (fixed) until the upper end part of the side surface Sps as illustrated in FIG. 22. In this case, in order to make the bottom surface Spg and the side surface Sps become continuous for sure, the correction ratio α(Y) is set to 1.0 in the connection part (the height of the side surface Sps=0). That is to say, the correction ratio α(Y) up to the height CamH of the image capture unit 15 can be expressed by the following Expression 7:

Correction ratio α(*Y*)=1.0−(1.0−αmax)*Y*/CamH      Expression 7

Figure 23:
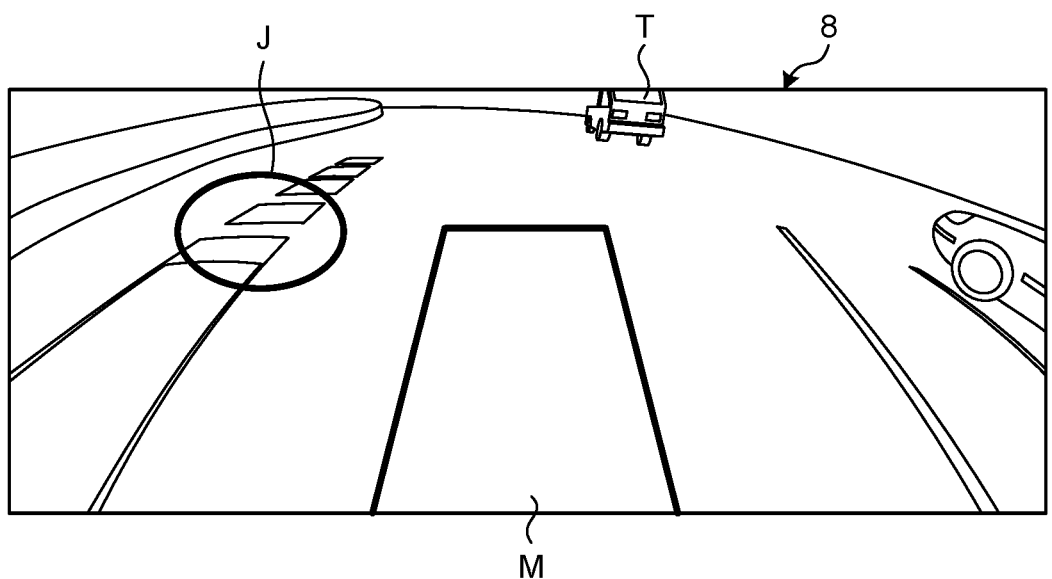
FIG. 23 is a schematic view illustrating a display example of a three-dimensional display image in a case where the correction ratio in the display control system according to the fourth embodiment is applied.

In this case, since the maximum correction ratio αmax is maintained at or above the height CamH of the image capture unit 15, the object T to be projected is not inclined at or above the height CamH of the image capture unit 15 on the side surface Sps. As a result, the inclination of the object T, which is inclined to the right as a whole in FIG. 21, is suppressed from the middle and the inclination of the entire object T becomes less visible as illustrated in FIG. 23. Thus, the driver feels less strange in the three-dimensional synthetic image to be displayed.

In the above embodiments, the three-dimensional synthetic image is generated by connecting the side image captured by the image capture unit 15*b* or the image capture unit 15*d* to the main image (central display image), that is, the front image captured by the image capture unit 15*c*. In another embodiment, the three-dimensional synthetic image may be generated by using the side image captured by the image capture unit 15*b* or the image capture unit 15*d* as the main image (central display image), and by combining the front image captured by the image capture unit 15*c* or the rear image captured by the image capture unit 15*a* with the side part, where the similar effect can be obtained.

The above embodiments explain by exemplifying that every time the ignition switch is turned on, the correction unit 30 calculates the correction ratio for each image capture unit 15 and store the correction ratio in the RAM 14*c* or the like. However, the position of each image capture unit 15 is fixed in the manufacturing factory of vehicles, dealers or the like, and thereafter is usually unchanged except when the image capture unit 15 is repaired or exchanged, for example. In view of this, the correction ratio α for each image capture unit 15 may be calculated in advance in the manufacturing factory or dealers, the three-dimensional coordinate (αX, Y, Z) of the point S used when the projection position of the image is corrected may be calculated, and the corresponding two-dimensional coordinate (U, V) may be saved in the ROM 14*b* or the SSD 14*f*. In this case, the process load on the ECU 14 can be reduced and the ECU 14 with the relatively low performance can also be used. Thus, the selection range when selecting the ECU 14 becomes wider and the ECU 14 with low cost can also be used, which is advantageous.

Some embodiments have been described; however, these embodiments are merely examples and do not intend to limit the scope of the invention. These novel embodiments can be carried out in other various modes and various omissions, replacements, and changes are possible within the scope not departing from the scope of the invention. These embodiments and modifications thereof are included in the scope and concept of the invention and in the invention according to the scope of claims and the equivalent scope thereof.

The invention claimed is:

1. A display control device comprising:
   an image acquisition unit that is provided to a vehicle and acquires a display target image that is at least one of a front image acquired from a front image capture unit that captures a region including a front of the vehicle and a rear image acquired from a rear image capture unit that captures a region including a rear of the vehicle;
   a projection plane acquisition unit that acquires a three-dimensional virtual projection plane to which the display target image is projectable, the three-dimensional virtual projection plane including at least a side surface that rises in a height direction from a ground contact surface of the vehicle;
   a correction unit that, in a case where the display target image acquired by the image acquisition unit is projected on the virtual projection plane, corrects a projection position of the display target image to a second direction, which is from a first coordinate corresponding to a position where the virtual projection plane intersects with a first virtual straight line extending in a first direction corresponding to a vehicle length direction of the vehicle from the front image capture unit or the rear image capture unit that captures the display target image to a second coordinate corresponding to a position where the virtual projection plane intersects with a virtual reference line extending in the first direction that is apart from the first virtual straight line in a vehicle width direction of the vehicle; and
   an image synthesis unit that projects the display target image on a corrected projection position, and generates a three-dimensional image.

2. The display control device according to claim 1, wherein
   the correction unit acquires a correction ratio for correcting the projection position to the second direction on the basis of a first distance in the second direction between the second coordinate and a fourth coordinate where the virtual projection plane intersects with a second virtual straight line connecting between a process target image capture unit that captures the display target image and a third coordinate where the virtual reference line intersects with a virtual reference plane set at a predetermined distance from the process target image capture unit in the first direction, and a second distance in the second direction between the first virtual straight line and the virtual reference line.

3. The display control device according to claim 2, wherein the virtual reference line extends in the first direction along a left side surface or a right side surface of a vehicle body of the vehicle.

4. The display control device according to claim 2, wherein
the image acquisition unit further acquires a side display target image corresponding to at least one of a left side image acquired from a left side image capture unit that captures a region including a left side of the vehicle and a right side image acquired from a right side image capture unit that captures a region including a right side of the vehicle,
the virtual reference line extends in the first direction from a position overlapping with the left side image capture unit or the right side image capture unit in the vehicle width direction, and
the image synthesis unit combines the side display target image with the display target image corrected by the correction unit, and generates the three-dimensional image.

5. A display control device comprising:
an image acquisition unit that is provided to a vehicle and acquires a display target image, the display target image being at least one of a left side image acquired from a left side image capture unit that captures a region including a left side of the vehicle and a right side image acquired from a right side image capture unit that captures a region including a right side of the vehicle;
a projection plane acquisition unit that acquires a three-dimensional virtual projection plane to which the display target image is projectable, the three-dimensional virtual projection plane including at least a side surface that rises in a height direction from a ground contact surface of the vehicle;
a correction unit that, in a case where the display target image acquired by the image acquisition unit is projected on the virtual projection plane, corrects a projection position of the display target image to a second direction, which is from a first coordinate corresponding to a position where the virtual projection plane intersects with a first virtual straight line extending in a first direction corresponding to a vehicle width direction of the vehicle from the left side image capture unit or the right side image capture unit that captures the display target image to a second coordinate corresponding to a position where the virtual projection plane intersects with a virtual reference line extending in the first direction that is apart from the first virtual straight line in a vehicle length direction of the vehicle; and
an image synthesis unit that projects the display target image on a corrected projection position, and generates a three-dimensional image.

6. The display control device according to claim 5, wherein the correction unit acquires a correction ratio for correcting the projection position to the second direction on the basis of a first distance in the second direction between the second coordinate and a fourth coordinate where the virtual projection plane intersects with a second virtual straight line connecting between a process target image capture unit that captures the display target image and a third coordinate where the virtual reference line intersects with a virtual reference plane set at a predetermined distance from the process target image capture unit in the first direction, and a second distance in the second direction between the first virtual straight line and the virtual reference line.

7. The display control device according to claim 6, wherein the virtual reference line extends in the first direction along a front surface or a rear surface of a vehicle body of the vehicle.

8. The display control device according to claim 6, wherein
the image acquisition unit further acquires a display target image in a front-rear direction that is at least one of a front image acquired from a front image capture unit that captures a region including a front of the vehicle and a rear image acquired from a rear image capture unit that captures a region including a rear of the vehicle,
the virtual reference line extends in the first direction from a position overlapping with the front image capture unit or the rear image capture unit in the vehicle length direction, and
the image synthesis unit combines the display target image in the front-rear direction with the display target image corrected by the correction unit, and generates the three-dimensional image.

9. The display control device according to claim 1, wherein the correction unit changes the correction of the projection position in accordance with a height from the ground contact surface of the vehicle.

10. The display control device according to claim 5, wherein the correction unit changes the correction of the projection position in accordance with a height from the ground contact surface of the vehicle.

* * * * *